(12) United States Patent
Wolfe et al.

(10) Patent No.: US 11,591,965 B2
(45) Date of Patent: Feb. 28, 2023

(54) THERMAL MANAGEMENT SYSTEM FOR TRANSFERRING HEAT BETWEEN FLUIDS

(71) Applicant: General Electric Company, Schenectady, NY (US)

(72) Inventors: Christopher Edward Wolfe, Niskayuna, NY (US); Hendrik Pieter Jacobus de Bock, Clifton Park, NY (US); William Dwight Gerstler, Niskayuna, NY (US); Brian Gene Brzek, Clifton Park, NY (US); Brandon Wayne Miller, Liberty Township, OH (US); Daniel Alan Niergarth, Norwood, OH (US); Kevin Robert Feldmann, Mason, OH (US); Kevin Edward Hinderliter, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/215,130

(22) Filed: Mar. 29, 2021

(65) Prior Publication Data

US 2022/0307419 A1 Sep. 29, 2022

(51) Int. Cl.
*F02C 7/141* (2006.01)
*F01P 1/00* (2006.01)

(52) U.S. Cl.
CPC .............. *F02C 7/141* (2013.01); *F01P 1/00* (2013.01); *F01P 2023/08* (2013.01);
(Continued)

(58) Field of Classification Search
CPC .... F02C 1/04; F02C 7/185; F02C 9/28; F28D 15/00; F28D 20/00; F28D 2021/0021; F28D 2021/0026; F28D 2020/0078
See application file for complete search history.

(56) References Cited

U.S. PATENT DOCUMENTS

| 2,585,842 A | 1/1952 | Messinger |
| 2,720,313 A | 10/1955 | Pattison |

(Continued)

FOREIGN PATENT DOCUMENTS

| CN | 101688477 A | 3/2010 |
| CN | 102407944 A | 4/2012 |

(Continued)

OTHER PUBLICATIONS

Landfill, Sewage, Biogas, Coal, Seam & Mines Gas Separation/Filtration, Kelburn Engineering—LandfillGas and Air Separation, 3 pages. www.kelburneng.com.uk/landfill-gas-bio-gas-sewer-gas.php.

*Primary Examiner* — Long T Tran
(74) *Attorney, Agent, or Firm* — Dority & Manning, P.A.

(57) ABSTRACT

A thermal management system for transferring heat between fluids includes a thermal transport bus through which a heat exchange fluid flows. Additionally, the system includes a heat source heat exchanger arranged along the bus such that heat is added to the fluid flowing through the heat source heat exchanger. Moreover, the system includes a plurality of heat sink heat exchangers arranged along the bus such that heat is removed from the fluid flowing through the plurality of heat sink heat exchangers. Furthermore, the system includes a bypass conduit fluidly coupled to the bus such that the bypass conduit allows the fluid to bypass one of the heat source heat exchanger or one of the heat sink heat exchangers. In addition, the system includes a valve configured to control a flow of the fluid through the bypass conduit based on a pressure of the fluid within the bus.

22 Claims, 8 Drawing Sheets

(52) U.S. Cl.
CPC ....... *F01P 2025/04* (2013.01); *F01P 2037/00* (2013.01); *F01P 2050/20* (2013.01); *F05D 2220/32* (2013.01); *F05D 2260/221* (2013.01)

(56) References Cited

U.S. PATENT DOCUMENTS

| | | | |
|---|---|---|---|
| 2,893,628 A | 7/1959 | Herman | |
| 3,050,240 A | 8/1962 | Darnell | |
| 3,178,105 A | 4/1965 | Darnell | |
| 3,522,008 A | 7/1970 | Defabaugh et al. | |
| 3,590,559 A | 7/1971 | Bragg | |
| 3,847,298 A | 11/1974 | Hamilton | |
| 3,895,243 A | 7/1975 | Amend et al. | |
| 3,902,658 A | 9/1975 | Madsen | |
| 4,138,856 A | 2/1979 | Orlowski | |
| 4,169,567 A | 10/1979 | Tamura | |
| 4,170,116 A | 10/1979 | Williams | |
| 4,199,975 A | 4/1980 | Schrock et al. | |
| 4,254,618 A | 3/1981 | Elovic | |
| 4,449,372 A | 5/1984 | Rilett | |
| 4,466,481 A | 8/1984 | Wilson et al. | |
| 4,503,682 A | 3/1985 | Rosenblatt | |
| 4,505,124 A | 3/1985 | Mayer | |
| 4,546,605 A | 10/1985 | Mortimer et al. | |
| 4,550,573 A | 11/1985 | Rannenberg | |
| 4,600,413 A | 7/1986 | Sugden | |
| 4,714,139 A | 12/1987 | Lorenz et al. | |
| 4,738,779 A | 4/1988 | Carroll et al. | |
| 4,755,197 A | 7/1988 | Benson et al. | |
| 4,773,212 A | 9/1988 | Griffin et al. | |
| 5,149,018 A | 9/1992 | Clark | |
| 5,267,608 A | 12/1993 | Coffinberry | |
| 5,305,616 A | 4/1994 | Coffinbeny | |
| 5,341,636 A | 8/1994 | Paul | |
| 5,414,992 A | 5/1995 | Glickstein | |
| 5,452,573 A | 9/1995 | Glickstein et al. | |
| 5,587,068 A | 12/1996 | Aho, Jr. et al. | |
| 5,622,621 A | 4/1997 | Kramer | |
| 5,667,168 A | 9/1997 | Fluegel | |
| 5,722,241 A | 3/1998 | Huber | |
| 5,724,806 A | 3/1998 | Homer | |
| 5,834,632 A | 11/1998 | Olender et al. | |
| 5,904,836 A | 5/1999 | Lee et al. | |
| 6,106,229 A | 8/2000 | Nikkanen et al. | |
| 6,134,876 A | 10/2000 | Hines et al. | |
| 6,182,435 B1 | 2/2001 | Niggemann et al. | |
| 6,250,097 B1 | 6/2001 | Lui et al. | |
| 6,253,554 B1 | 7/2001 | Kobayashi et al. | |
| 6,294,091 B1 | 9/2001 | Hoff | |
| 6,415,595 B1 | 7/2002 | Wilmot, Jr. et al. | |
| 6,435,454 B1 | 8/2002 | Engelhardt | |
| 6,460,353 B2 | 10/2002 | Udobot et al. | |
| 6,701,717 B2 | 3/2004 | Flatman et al. | |
| 6,702,729 B2 | 3/2004 | Mazzuca | |
| 6,796,131 B2 | 9/2004 | Sampson | |
| 6,892,710 B2 | 5/2005 | Ekstam | |
| 6,939,392 B2 | 9/2005 | Huang et al. | |
| 7,000,425 B2 | 2/2006 | Army, Jr. et al. | |
| 7,093,437 B2 | 8/2006 | Spadaccini et al. | |
| 7,260,926 B2 | 8/2007 | Sabatino et al. | |
| 7,334,407 B2 | 2/2008 | Spadaccini et al. | |
| 7,377,098 B2 | 5/2008 | Walker et al. | |
| 7,387,602 B1 | 6/2008 | Kirsch | |
| 7,398,641 B2 | 7/2008 | Stretton et al. | |
| 7,431,818 B2 | 10/2008 | Cipollini | |
| 7,459,081 B2 | 12/2008 | Koenig et al. | |
| 7,478,525 B2 | 1/2009 | Iya et al. | |
| 7,536,851 B2 | 5/2009 | McLain | |
| 7,569,099 B2 | 8/2009 | Coffin et al. | |
| 7,628,965 B2 | 12/2009 | Johnson et al. | |
| 7,694,916 B2 | 4/2010 | Limaye et al. | |
| 7,735,670 B2 | 6/2010 | Zaki et al. | |
| 7,744,827 B2 | 6/2010 | Vanderspurt et al. | |
| 7,810,332 B2 | 10/2010 | Olmes et al. | |
| 7,824,470 B2 | 11/2010 | Chiappetta et al. | |
| 7,836,680 B2 | 11/2010 | Schwarz et al. | |
| 7,882,704 B2 | 2/2011 | Chen | |
| 7,886,580 B2 | 2/2011 | Kumar et al. | |
| 7,896,292 B2 | 3/2011 | Limaye et al. | |
| 7,905,259 B2 | 3/2011 | Johnson et al. | |
| 7,966,807 B2 | 6/2011 | Norris et al. | |
| 7,980,293 B2 | 7/2011 | Jensen | |
| 7,987,676 B2 | 8/2011 | Ast et al. | |
| 8,055,437 B2 | 11/2011 | Proietty et al. | |
| 8,141,360 B1 | 3/2012 | Huber | |
| 8,177,884 B2 | 5/2012 | Schmidt et al. | |
| 8,231,714 B2 | 7/2012 | Cornet et al. | |
| 8,261,258 B1 | 9/2012 | Chillar et al. | |
| 8,261,593 B1 | 9/2012 | Sanders | |
| 8,291,748 B2 | 10/2012 | Kumar et al. | |
| 8,388,830 B2 | 3/2013 | Sohn et al. | |
| 8,424,285 B2 | 4/2013 | Veilleux, Jr. | |
| 8,450,020 B2 | 5/2013 | Sinha et al. | |
| 8,499,567 B2 | 8/2013 | Hagh et al. | |
| 8,499,822 B2 | 8/2013 | Bulin et al. | |
| 8,522,572 B2 | 9/2013 | Coffinberry et al. | |
| 8,591,102 B2 | 11/2013 | Frach et al. | |
| 8,602,362 B2 | 12/2013 | Buchwald | |
| 8,663,996 B2 | 3/2014 | Beeson | |
| 8,747,055 B2 | 6/2014 | McCune et al. | |
| 8,765,070 B2 | 7/2014 | Norton et al. | |
| 8,776,866 B2 | 7/2014 | Cederberg et al. | |
| 8,789,377 B1 | 7/2014 | Brostmeyer | |
| 8,821,362 B2 | 9/2014 | Kidd et al. | |
| 8,828,344 B2 | 9/2014 | K-WLam et al. | |
| 8,858,161 B1 | 10/2014 | Ryznic et al. | |
| 8,944,367 B2 | 2/2015 | Bystry, Jr. et al. | |
| 8,978,353 B2 | 3/2015 | Norton et al. | |
| 8,984,884 B2 | 3/2015 | Xu et al. | |
| 9,014,791 B2 | 4/2015 | Held | |
| 9,038,397 B2 | 5/2015 | Papa et al. | |
| 9,114,877 B2 | 8/2015 | Weber et al. | |
| 9,120,580 B2 | 9/2015 | Sampath | |
| 9,144,768 B2 | 9/2015 | Tichborne et al. | |
| 9,162,162 B2 | 10/2015 | Yount | |
| 9,200,855 B2 | 12/2015 | Kington et al. | |
| 9,231,267 B2 | 1/2016 | McAlister | |
| 9,284,057 B2 | 3/2016 | Kelnhofer | |
| 9,328,661 B2 | 5/2016 | Ho et al. | |
| 9,328,978 B2 | 5/2016 | Appukuttan et al. | |
| 9,410,482 B2 | 8/2016 | Krautheim et al. | |
| 9,429,072 B2 | 8/2016 | Diaz et al. | |
| 9,435,246 B2 | 9/2016 | Devarakonda | |
| 9,458,764 B2 | 10/2016 | Alecu et al. | |
| 9,474,186 B2 | 10/2016 | Campbell et al. | |
| 9,561,856 B2 | 2/2017 | Mevenkamp et al. | |
| 9,567,095 B2 | 2/2017 | McCarthy et al. | |
| 9,580,185 B2 | 2/2017 | Rhoden et al. | |
| 9,656,187 B2 | 5/2017 | Lo et al. | |
| 9,687,773 B2 | 6/2017 | Johnson et al. | |
| 9,724,625 B2 | 8/2017 | Lo | |
| 9,739,546 B2 | 8/2017 | Bertilsson et al. | |
| 9,752,507 B2 | 9/2017 | Selstad et al. | |
| 9,771,867 B2 | 9/2017 | Karam et al. | |
| 9,829,259 B2 | 11/2017 | Nyander et al. | |
| 9,834,315 B2 | 12/2017 | Lo et al. | |
| 9,863,322 B2 | 1/2018 | Williams | |
| 9,885,290 B2 | 2/2018 | Della-Fera et al. | |
| 9,897,054 B2 | 2/2018 | Lo et al. | |
| 10,260,419 B2 | 4/2019 | Cerny et al. | |
| 10,352,243 B2 | 7/2019 | Mizukami et al. | |
| 2007/0006591 A1 | 1/2007 | Spadaccini et al. | |
| 2009/0133380 A1 | 5/2009 | Donnerhack | |
| 2009/0158739 A1 | 6/2009 | Messmer | |
| 2009/0188234 A1 | 7/2009 | Suciu et al. | |
| 2009/0229812 A1 | 9/2009 | Pineo et al. | |
| 2010/0101231 A1 | 4/2010 | Westmeier | |
| 2010/0139288 A1 | 6/2010 | Rago | |
| 2010/0212857 A1 | 8/2010 | Bulin et al. | |
| 2010/0313591 A1 | 12/2010 | Lents et al. | |
| 2011/0000227 A1 | 1/2011 | Kamiya | |
| 2011/0150634 A1 | 6/2011 | Bajusz et al. | |
| 2011/0162387 A1 | 7/2011 | Chir et al. | |
| 2011/0262309 A1 | 10/2011 | Limaye et al. | |

(56) References Cited

U.S. PATENT DOCUMENTS

| | | |
|---|---|---|
| 2012/0039430 A1* | 2/2012 | Abel .................. E21B 43/2403 376/325 |
| 2012/0048509 A1 | 3/2012 | Weber et al. |
| 2012/0111095 A1 | 5/2012 | Sheehan |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2013/0247587 A1 | 9/2013 | Lo |
| 2014/0000275 A1 | 1/2014 | Kesseli et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0083378 A1 | 3/2015 | Banach |
| 2015/0114611 A1 | 4/2015 | Morris et al. |
| 2015/0159867 A1 | 6/2015 | Patrick et al. |
| 2015/0375868 A1 | 12/2015 | Smith et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0131036 A1 | 5/2016 | Bintz et al. |
| 2016/0138431 A1 | 5/2016 | Lear, Jr. |
| 2016/0167802 A1 | 6/2016 | Lo et al. |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0290235 A1 | 10/2016 | Ekanayake et al. |
| 2016/0305440 A1 | 10/2016 | Laboda et al. |
| 2016/0326963 A1 | 11/2016 | Yamazaki |
| 2016/0341126 A1 | 11/2016 | Kupratis et al. |
| 2016/0356224 A1 | 12/2016 | Farnum et al. |
| 2016/0369700 A1 | 12/2016 | Ribarov et al. |
| 2017/0030266 A1 | 2/2017 | Cerny et al. |
| 2017/0044984 A1 | 2/2017 | Pesyna et al. |
| 2017/0081040 A1 | 3/2017 | Pal |
| 2017/0096910 A1 | 4/2017 | Raimarckers et al. |
| 2017/0113807 A1 | 4/2017 | Burnell et al. |
| 2017/0114721 A1 | 4/2017 | Miller et al. |
| 2017/0141419 A1 | 5/2017 | Wu et al. |
| 2017/0159566 A1 | 6/2017 | Sennoun et al. |
| 2017/0167382 A1 | 6/2017 | Miller et al. |
| 2017/0184027 A1 | 6/2017 | Moniz et al. |
| 2017/0260905 A1 | 9/2017 | Schmitz |
| 2017/0291714 A1 | 10/2017 | Corman |
| 2017/0321607 A1* | 11/2017 | Sweeney ................. F02C 7/224 |
| 2018/0016025 A1 | 1/2018 | Rheaume et al. |
| 2018/0038654 A1 | 2/2018 | Popp et al. |
| 2018/0056233 A1 | 3/2018 | Henson et al. |
| 2018/0056234 A1 | 3/2018 | Weng et al. |
| 2018/0071659 A1 | 3/2018 | Rhoden |
| 2018/0118367 A1 | 5/2018 | Rheaume et al. |
| 2018/0179917 A1* | 6/2018 | Apte ....................... F01D 15/10 |
| 2019/0128186 A1 | 5/2019 | Cerny et al. |
| 2019/0153952 A1* | 5/2019 | Niergarth ................. F02C 7/14 |
| 2019/0153953 A1 | 5/2019 | Niergarth et al. |
| 2019/0203644 A1 | 7/2019 | Niergarth et al. |
| 2019/0218971 A1 | 7/2019 | Niergarth et al. |
| 2019/0257247 A1* | 8/2019 | Pal ........................... F02C 7/18 |
| 2019/0383564 A1 | 12/2019 | Miller et al. |

FOREIGN PATENT DOCUMENTS

| | | |
|---|---|---|
| EP | 2003311 A2 | 12/2008 |
| EP | 3018304 A1 | 5/2016 |
| EP | 3075957 A1 | 10/2016 |
| EP | 3249334 A1 | 11/2017 |
| EP | 3508709 A1 | 7/2019 |
| EP | 3514349 A1 | 7/2019 |
| GB | 2034822 A | 6/1980 |
| GB | 2136880 A | 9/1984 |
| GB | 2204361 A | 11/1988 |
| JP | S59-32893 U | 2/1984 |
| JP | 2001/317371 A | 11/2001 |
| JP | 2010/522842 A | 7/2010 |
| WO | WO02/16743 A1 | 2/2002 |
| WO | WO2002/038938 A1 | 5/2002 |
| WO | WO2006/079438 A1 | 8/2006 |
| WO | WO2011/038188 A1 | 3/2011 |
| WO | WO2015/105552 A1 | 7/2015 |

* cited by examiner

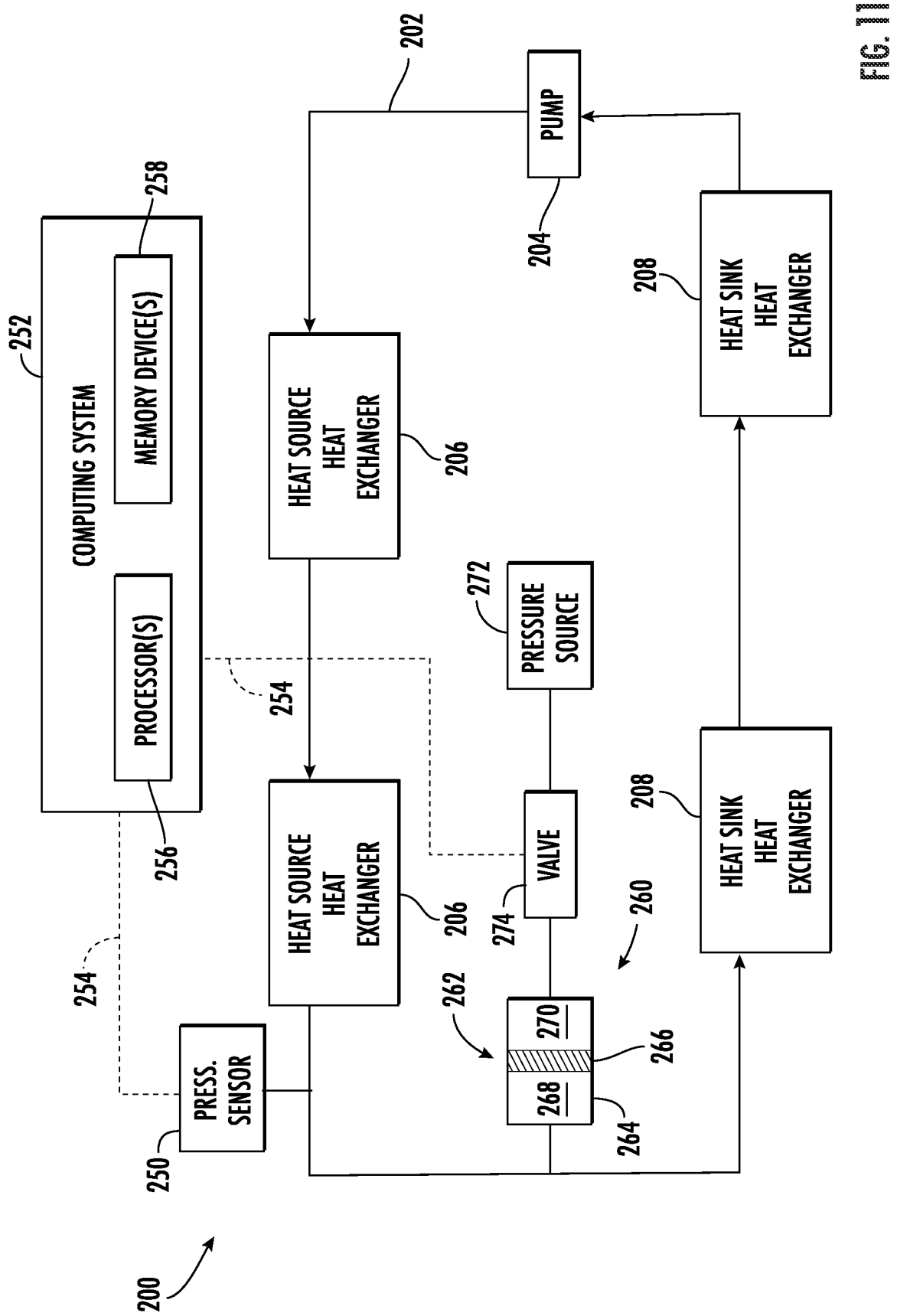

THERMAL MANAGEMENT SYSTEM FOR TRANSFERRING HEAT BETWEEN FLUIDS

FIELD

The present disclosure generally pertains to thermal management systems and, more particularly, to a thermal management system for transferring heat between fluids, such as between fluids supporting the operation of an aircraft.

BACKGROUND

Aircraft typically include various accessory systems supporting the operation of the aircraft and/or its gas turbine engine(s). For example, such accessory systems may include a lubrication system that lubricates components of the engine(s), an engine cooling system that provides cooling air to engine components, an environmental control system that provides cooled air to the cabin of the aircraft, and/or the like. As such, heat is added or removed from a fluid (e.g., oil, air, etc.) during operation of these accessory systems.

To facilitate such heat addition/removal, the aircraft includes one or more heat exchangers in operative association with each accessory system. Because each heat exchanger is dedicated to a specific accessory system, the heat exchangers must be designed to accommodate the maximum heat addition/removal needed by its corresponding system. Such a configuration may inefficiently use of the heat exchangers. For example, this configuration may result in certain heat exchangers operating at maximum capacity, while other heat exchangers operate at a nominal capacity (or not at all).

In this respect, thermal management systems in which the heat exchangers of multiple accessory systems are fluidly coupled together have been developed. In such thermal management systems, when an accessory system is placing a high thermal load on its heat exchanger(s), some of this load can be transferred to the heat exchangers associated with other accessory systems having excess capacity. While these thermal management systems work well, further improvements are needed. For example, during operation, the heat added to or removed from such a thermal management system may, in certain instances, cause the pressure of a heat exchange fluid flowing through the various heat exchangers to fall outside of a desired pressure range. When this occurs, the thermal management system may operate less efficiently and/or incur accelerated degradation.

Accordingly, an improved thermal management system for transferring heat between fluids would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a thermal management system for transferring heat between fluids. The thermal management system includes a thermal transport bus through which a heat exchange fluid flows. Additionally, the thermal management system includes a heat source heat exchanger arranged along the thermal transport bus such that heat is added to the heat exchange fluid flowing through the heat source heat exchanger. Moreover, the thermal management system includes a plurality of heat sink heat exchangers arranged along the thermal transport bus such that heat is removed from the heat exchange fluid flowing through the plurality of heat sink heat exchangers. Furthermore, the thermal management system includes a bypass conduit fluidly coupled to the thermal transport bus such that the bypass conduit allows the heat exchange fluid to bypass one of the heat source heat exchanger or one of the plurality of heat sink heat exchangers. In addition, the thermal management system includes a valve configured to control a flow of the heat exchange fluid through the bypass conduit based on a pressure of the heat exchange fluid within the thermal transport bus.

In another aspect, the present subject matter is directed to a thermal management system for transferring heat between fluids. The thermal management system includes a thermal transport bus through which a heat exchange fluid flows. Additionally, the thermal management system includes a heat source heat exchanger arranged along the thermal transport bus such that heat is added to the heat exchange fluid flowing through the heat source heat exchanger. Moreover, the thermal management system includes a plurality of heat sink heat exchangers arranged along the thermal transport bus such that heat is removed from the heat exchange fluid flowing through the heat source heat exchanger. Furthermore, the thermal management system includes a heat transfer fluid mass control device configured to increase or decrease a mass of the heat transfer fluid flowing through the thermal transport bus based on a pressure of the heat exchange fluid within the thermal transport bus.

In a further aspect, the present subject matter is directed to a thermal management system for transferring heat between fluids. The thermal management system includes a thermal transport bus through which a heat exchange fluid flows. Additionally, the thermal management system includes a heat source heat exchanger arranged along the thermal transport bus such that heat is added to the heat exchange fluid flowing through the heat source heat exchanger. Furthermore, the thermal management system includes a plurality of heat sink heat exchangers arranged along the thermal transport bus such that heat is removed from the heat exchange fluid flowing through the plurality of heat sink heat exchangers. Moreover, the thermal management system includes a third-stream flow path of a gas turbine engine, with the third-stream flow path extending from a compressed air flow path upstream of a combustion section of the gas turbine engine to a bypass passage of the gas turbine engine. In this respect, at least one of the plurality of heat exchangers is configured to transfer heat from the heat exchange fluid to air flowing through the third-stream flow path.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 11 is a schematic view of a further embodiment of a thermal management system for transferring heat between fluids.

Figure 1:
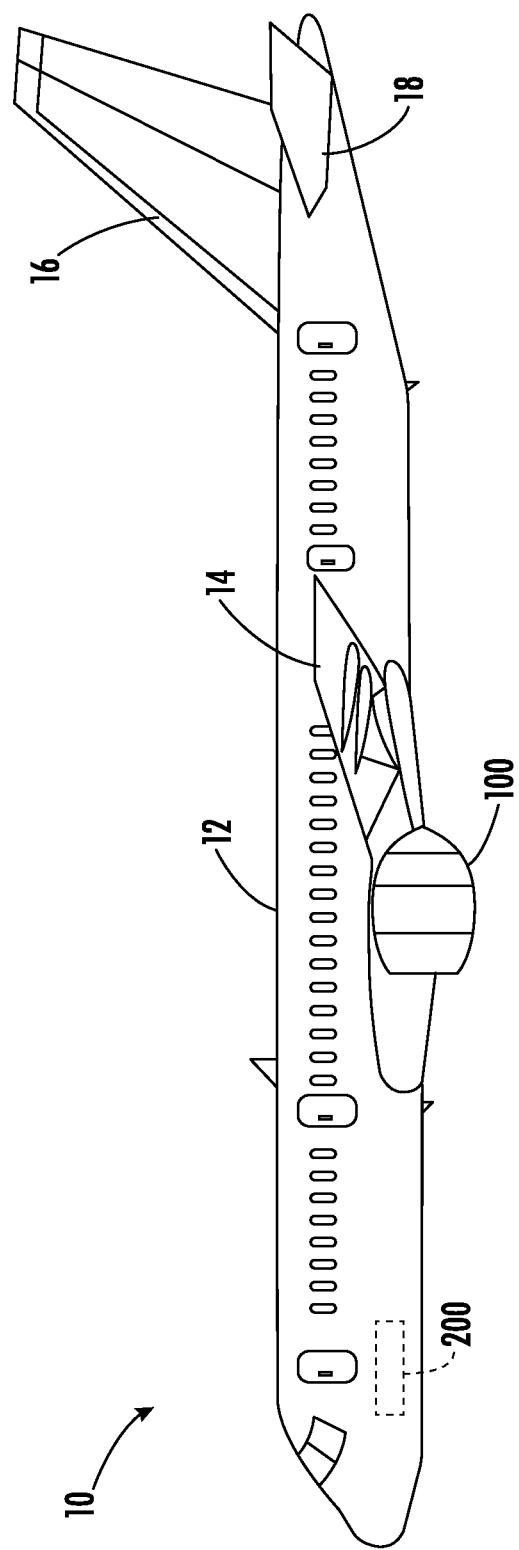
FIG. 1 is a side view of one embodiment of an aircraft.

Repeat use of reference characters in the present specification and drawings is intended to represent the same or analogous features or elements of the present invention.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a thermal management system for transferring heat between fluids. As will be described below, the disclosed thermal management system may be used to transfer heat between fluids supporting the operation of an aircraft, such as oil, fuel, air, and the like. In several embodiments, the thermal management system includes a thermal transport bus (e.g., a fluid conduit) through which a heat exchange fluid (e.g., a supercritical fluid, such as supercritical carbon dioxide) flows. Furthermore, the thermal management system includes one or more heat source heat exchangers arranged along the thermal transport bus. As such, heat is added to the heat exchange fluid flowing through the heat source heat exchanger(s). Moreover, the system includes a plurality of heat sink heat exchangers arranged along the thermal transport bus. In this respect, heat is removed from the heat exchange fluid flowing through the heat sink heat exchangers.

In several embodiments, the thermal management system includes one or more bypass conduits and one or more associated valves. More specifically, in such embodiments, each bypass conduit is fluidly coupled to the thermal transport bus such that the bypass conduit allows heat exchange fluid to bypass one of the heat exchangers. Additionally, each valve is configured to control the flow of the heat exchange fluid through the associated bypass conduit based on a pressure of the heat exchange fluid within the thermal transport bus. For example, when the pressure of the heat exchange fluid within the thermal transport bus exceeds a maximum pressure value, the valve(s) associated with the bypass conduit(s) allowing the heat exchange fluid to bypass the heat source heat exchanger(s) open. In such instances, less heat is added to the heat exchange fluid, thereby reducing the temperature and, thus, pressure of the fluid. Conversely, when the pressure of the heat exchange fluid within the thermal transport bus falls below a minimum pressure value, the valve(s) associated with the bypass conduit(s) allowing the heat exchange fluid to bypass the heat sink heat exchanger(s) open. In such instances, less heat is removed to the heat exchange fluid, thereby increasing the temperature and, thus, pressure of the fluid. In this respect, the operation of the valve(s) allows the disclosed thermal management system to maintain the pressure of the heat exchange fluid within a specified range of values as the thermal load placed on the system varies.

Furthermore, in several embodiments, the thermal management system includes a heat transfer fluid mass control device fluidly coupled to the thermal transport bus. In general, the heat transfer fluid mass control device is configured to increase or decrease the mass of the heat transfer fluid flowing through the thermal transport bus based on a pressure of the heat exchange fluid within the thermal transport bus. For example, when the pressure of the heat exchange fluid within the thermal transport bus exceeds a maximum pressure value, the heat transfer fluid mass control device removes heat exchange fluid from the bus. In such instances, the mass of the heat exchange fluid within the thermal transport bus decreases, thereby reducing the temperature and pressure of the fluid. Conversely, when the pressure of the heat exchange fluid within the thermal transport bus falls below a minimum pressure value, the heat transfer fluid mass control device adds heat exchange fluid to the bus. In such instances, the mass of the heat exchange fluid within the thermal transport bus increases, thereby raising the temperature and pressure of the fluid. Thus, the operation of the heat transfer fluid mass control device allows the disclosed thermal management system to maintain the pressure of the heat exchange fluid within the thermal transport bus within a specified range of values as the thermal load placed on the system varies.

Referring now to the drawings, FIG. 1 is a side view of one embodiment of an aircraft 10. As shown, in several embodiments, the aircraft 10 includes a fuselage 12 and a pair of wings 14 (one is shown) extending outward from the fuselage 12. In the illustrated embodiment, a gas turbine engine 100 is supported on each wing 14 to propel the aircraft through the air during flight. Additionally, as shown, the aircraft 10 includes a vertical stabilizer 16 and a pair of horizontal stabilizers 18 (one is shown). However, in alternative embodiments, the aircraft 10 may include any other suitable configuration, such as any other suitable number or type of engines.

Furthermore, the aircraft 10 may include a thermal management system 200 for transferring heat between fluids supporting the operation of the aircraft 10. More specifically, the aircraft 10 may include one or more accessory systems configured to support the operation of the aircraft 10. For example, in some embodiments, such accessory systems include a lubrication system that lubricates components of the engines 100, a cooling system that provides cooling air to components of the engines 100, an environmental control system that provides cooled air to the cabin of the aircraft 10, and/or the like. In such embodiments, the thermal management system 200 is configured to transfer heat from one or more fluids supporting the operation of the aircraft 10 (e.g., the oil of the lubrication system, the air of the cooling system and/or the environmental control system, and/or the like) to one or more other fluids supporting the operation of the aircraft 10 (e.g., the fuel supplied to the engines 100). However, in alternative embodiments, the thermal management system 200 may be configured to transfer heat between any other suitable fluids supporting the operation of the aircraft 10.

The configuration of the aircraft 10 described above and shown in FIG. 1 is provided only to place the present subject matter in an exemplary field of use. Thus, the present subject matter may be readily adaptable to any manner of aircraft.

Figure 2:
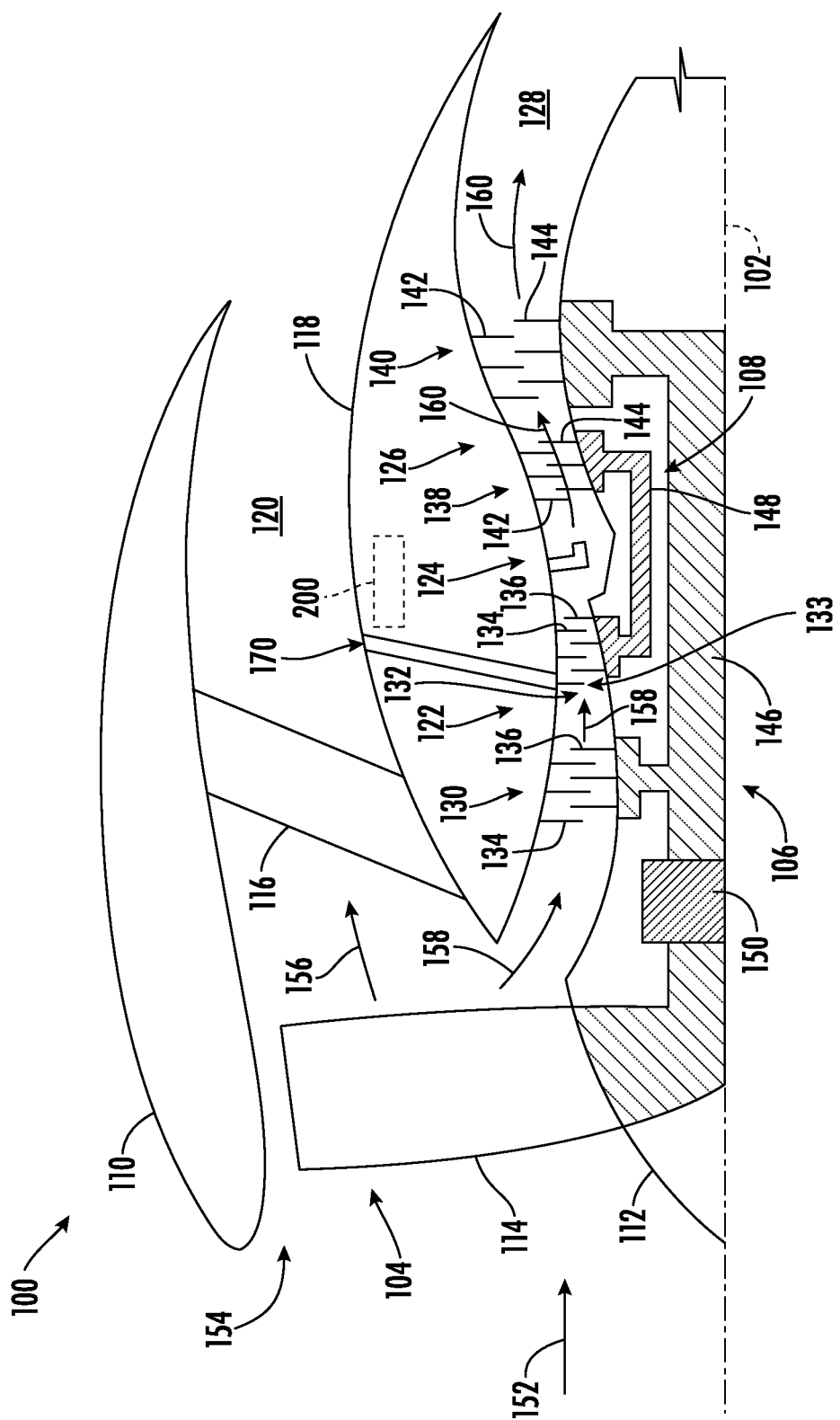
FIG. 2 is a schematic cross-sectional view of one embodiment of a gas turbine engine of an aircraft.

FIG. 2 is a schematic cross-sectional view of one embodiment of a gas turbine engine 100. In the illustrated embodiment, the engine 100 is configured as a high-bypass turbofan engine. However, in alternative embodiments, the engine 100 may be configured as a propfan engine, a turbojet engine, a turboprop engine, a turboshaft gas turbine engine, or any other suitable type of gas turbine engine.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 may include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, thereby permitting the LP spool 106 to rotate the fan 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128. For example, in some embodiments, the compressor section 122 may include a low-pressure (LP) compressor 130 of the LP spool 106 and a high-pressure (HP) compressor 132 of the HP spool 108 positioned downstream from the LP compressor 130 along the axial centerline 102. Each compressor 130, 132 may, in turn, include one or more rows of stator vanes 134 interdigitated with one or more rows of compressor rotor blades 136. As such, the compressors 130, 132 define a compressed air flow path 133 extending therethrough. Moreover, in some embodiments, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 may, in turn, include one or more rows of stator vanes 142 interdigitated with one or more rows of turbine rotor blades 144.

Additionally, the LP spool 106 includes the low-pressure (LP) shaft 146 and the HP spool 108 includes a high pressure (HP) shaft 148 positioned concentrically around the LP shaft 146. In such embodiments, the HP shaft 148 rotatably couples the rotor blades 144 of the HP turbine 138 and the rotor blades 136 of the HP compressor 132 such that rotation of the HP turbine rotor blades 144 rotatably drives HP compressor rotor blades 136. As shown, the LP shaft 146 is directly coupled to the rotor blades 144 of the LP turbine 140 and the rotor blades 136 of the LP compressor 130. Furthermore, the LP shaft 146 is coupled to the fan 104 via a gearbox 150. In this respect, the rotation of the LP turbine rotor blades 144 rotatably drives the LP compressor rotor blades 136 and the fan blades 114.

In several embodiments, the engine 100 may generate thrust to propel an aircraft. More specifically, during operation, air (indicated by arrow 152) enters an inlet portion 154 of the engine 100. The fan 104 supplies a first portion (indicated by arrow 156) of the air 152 to the bypass airflow passage 120 and a second portion (indicated by arrow 158) of the air 152 to the compressor section 122. The second portion 158 of the air 152 first flows through the LP compressor 130 in which the rotor blades 136 therein progressively compress the second portion 158 of the air 152. Next, the second portion 158 of the air 152 flows through the HP compressor 132 in which the rotor blades 136 therein continue progressively compressing the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 which the HP turbine rotor blades 144 extract a first portion of kinetic and/or thermal energy therefrom. This energy extraction rotates the HP shaft 148, thereby driving the HP compressor 132. The combustion gases 160 then flow through the LP turbine 140 in which the LP turbine rotor blades 144 extract a second portion of kinetic and/or thermal energy therefrom. This energy extraction rotates the LP shaft 146, thereby driving the LP compressor 130 and the fan 104 via the gearbox 150. The combustion gases 160 then exit the engine 100 through the exhaust section 128.

As mentioned above, the aircraft 10 may include a thermal management system 200 for transferring heat between fluids supporting the operation of the aircraft 10. In this respect, the thermal management system 200 may be positioned within the engine 100. For example, as shown in FIG. 2, in the illustrated embodiment, the thermal management system 200 is positioned within the casing 118 of the engine 100. However, in alternative embodiments, the thermal management system 200 may be positioned at any other suitable location within the engine 100.

Furthermore, in several embodiments, the engine 100 defines a third-stream flow path 170. In general, the third-stream flow path 170 extends from the compressed air flow path 170 defined by the compressor section 122 to the bypass passage 120. In this respect, the third-stream flow path 170 allows compressed a portion of the compressed air 158 from the compressor section 122 to bypass the combustion section 124. More specifically, in some embodiments, the third-stream flow path 170 may define a concentric or non-concentric passage relative to the compressed air flow path 170 downstream of one or more of the compressors 130, 132 or the fan 104. The third-stream flow path 170 may be configured to selectively remove a portion of compressed air 158 from the compressed air flow path 170 via one or more variable guide vanes, nozzles, or other actuatable flow control structures. In addition, as will be described below, in some embodiments, the thermal management system 200 may transfer heat to the air flowing through the third-stream flow path 170.

The configuration of the gas turbine engine 100 described above and shown in FIG. 2 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 3:
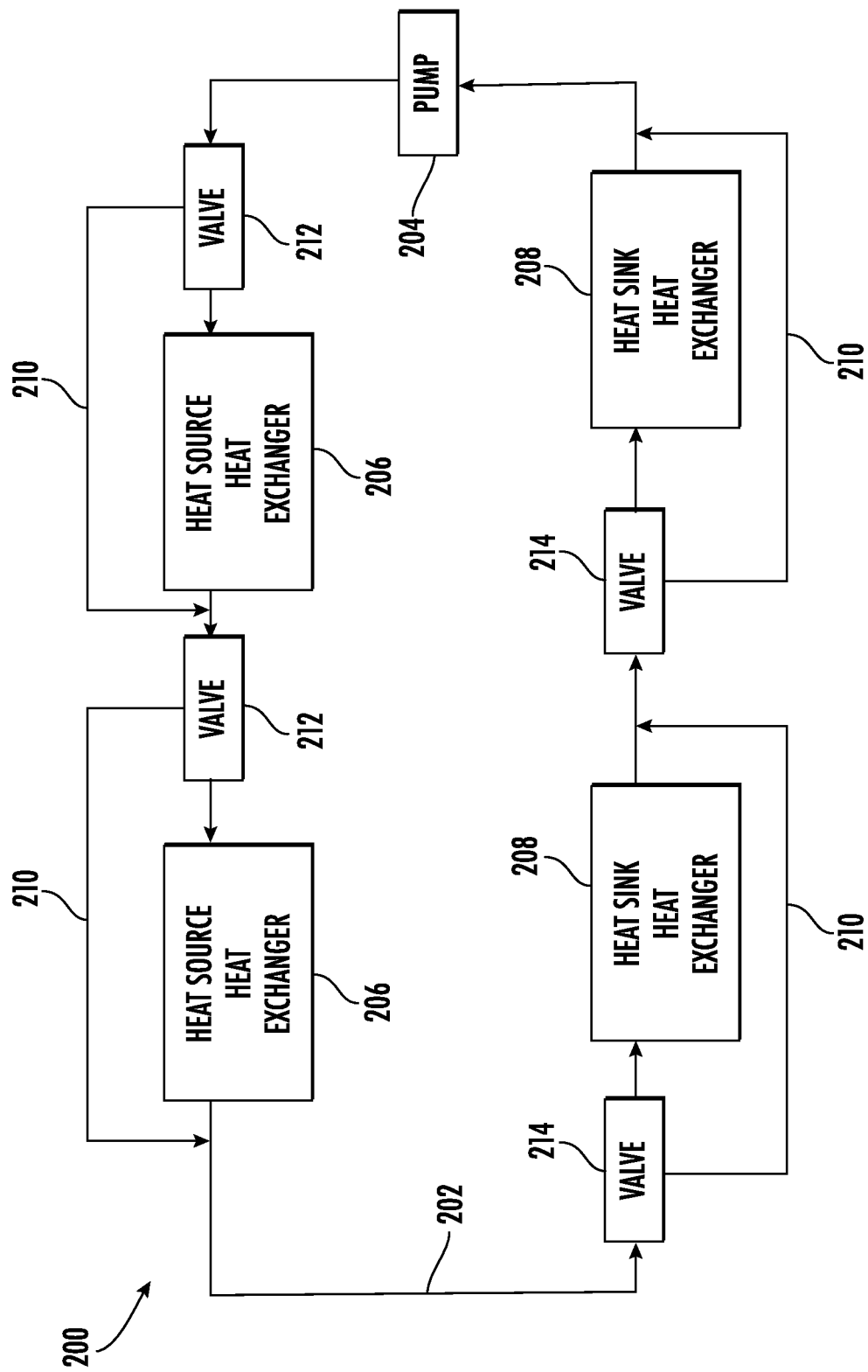
FIG. 3 is a schematic view of one embodiment of a thermal management system for transferring heat between fluids.

FIG. 3 is a schematic view of one embodiment of a thermal management system 200 for transferring heat between fluids. In general, the system thermal management 200 will be discussed in the context of the aircraft 10 and the gas turbine engine 100 described above and shown in FIGS. 1 and 2. However, the disclosed thermal management system 200 may be implemented within any aircraft having any other suitable configuration and/or any gas turbine engine having any other suitable configuration.

As shown, the thermal management system 200 includes a thermal transport bus 202. Specifically, in several embodiments, the thermal transport bus 202 is configured as one or more fluid conduits through with a heat exchange fluid flows. As will be described below, the heat exchange fluid flows through various heat exchangers such that heat is added to and removed from the heat exchange fluid. In this respect, the heat exchange fluid may be any suitable fluid, such as super critical carbon dioxide. Moreover, in such embodiments, the thermal management system 200 includes a pump 204 configured to pump the heat exchange fluid through the thermal transport bus 202.

Additionally, the thermal management system 200 includes one or more heat source heat exchangers 206 arranged along the thermal transport bus 202. More specifically, the heat source heat exchanger(s) 206 is fluidly coupled to the thermal transport bus 202 such that the heat exchange fluid flows through the heat source heat exchanger(s) 206. In this respect, the heat source heat exchanger(s) 206 is configured to transfer heat from fluids supporting the operation of the aircraft 10 to the heat exchange fluid, thereby cooling the fluids supporting the operation of the aircraft 10. Thus, the heat source heat exchanger(s) 206 adds heat to the heat exchange fluid. Although FIG. 3 illustrates two heat source heat exchangers 206, the thermal management system 200 may include a single heat source heat exchanger 206 or three or more heat source heat exchangers 206.

The heat source heat exchanger(s) 206 may correspond to any suitable heat exchanger(s) that cool a fluid supporting the operation of the aircraft 10. For example, in one embodiment, at least one of the heat exchangers 206 is a heat exchanger(s) of the lubrication system(s) of the engine(s) 100. In such an embodiment, this heat exchanger(s) 106 transfers heat from the oil lubricating the engine(s) 100 to the heat transfer fluid. In another embodiment, at least one of the heat exchangers 206 is a heat exchanger(s) of the cooling system of the engine(s) 100. In such an embodiment, this heat exchanger(s) 106 transfers heat from the cooling air bled from the compressor section(s) 122 (or a compressor discharge plenum) of the engine(s) 100 to the heat transfer fluid. However, in alternative embodiments, the heat source heat exchanger(s) 206 may correspond to any other suitable heat exchangers that cool a fluid supporting the operation of the aircraft 10.

Furthermore, the thermal management system 200 includes a plurality of heat sink heat exchangers 208 arranged along the thermal transport bus 202. More specifically, the heat sink heat exchangers 208 are fluidly coupled to the thermal transport bus 202 such that the heat exchange fluid flows through the heat sink heat exchangers 208. In this respect, the heat sink heat exchangers 208 are configured to transfer heat from the heat exchange fluid to other fluids supporting the operation of the aircraft 10, thereby heating the other fluids supporting the operation of the aircraft 10. Thus, the heat sink heat exchangers 208 remove heat to the heat exchange fluid. Although FIG. 2 illustrates two heat sink heat exchangers 208, the thermal management system 200 may include three or more heat sink heat exchangers 208.

The heat sink heat exchangers 208 may correspond to any suitable heat exchangers that heat a fluid supporting the operation of the aircraft 10. For example, in one embodiment, at least of one of the heat exchangers 206 is a heat exchanger(s) of the fuel system(s) of the engine(s) 100. In such an embodiment, the fuel system heat exchanger(s) 106 transfers heat from the heat transfer fluid to the fuel supplied to the engine(s) 100. In another embodiment, at least one of the heat exchangers 206 is a heat exchanger(s) in contact with the air 156 flowing through the bypass airflow passage(s) 120 of the engine(s) 100. In such an embodiment, this heat exchanger(s) 106 transfers heat from the heat exchange fluid to the air 156 flowing through the bypass airflow passage(s) 120.

In several embodiments, one or more of the heat exchangers 106 are configured to transfer heat to the air flowing through the third-stream flow path 170. In such embodiments, the heat exchanger(s) 106 is in contact with the air flow through the third-stream flow path 170. Thus, heat from the heat exchange fluid flowing through the thermal transport bus 202 may be transferred to the air flow through the third-stream flow path 170. The use of the third-stream flow path 170 as a heat sink for the thermal management system 200 provides one or more technical advantages. For example, the third-stream flow path 170 provides greater cooling than other sources of bleed air because a larger volume of air flows through the third-stream flow path 170 than other bleed air flow paths. Moreover, the air flowing through third-stream flow path 170 is cooler than the air flowing through other bleed air flow paths and the compressor bleed air. Additionally, the air in the third-stream flow path 170 is pressurized, thereby allowing the heat exchanger(s) 106 to be smaller than heat exchangers relying on other heat sinks within the engine. Furthermore, in embodiments in which the engine 100 is unducted, using the third-stream flow path 170 as a heat sink does not increase drag on the engine 100 unlike the use of ambient air (e.g., a heat exchanger in contact with air flowing around the engine 100). However, in alternative embodiments, the heat sink heat exchangers 208 may correspond to any other suitable heat exchangers that heats a fluid supporting the operation of the aircraft 10.

Moreover, in several embodiments, the thermal management system 200 includes one or more bypass conduits 210. Specifically, as shown, each bypass conduit 210 is fluidly coupled to the thermal transport bus 202 such that the bypass conduit 210 allows at least a portion of the heat exchange fluid to bypass one of the heat exchangers 206, 208. As will be described below, by allowing heat exchange fluid to bypass one or more of the heat exchangers 206, 208, the temperature of the heat exchange fluid within the thermal transport bus 202 may be adjusted, thereby regulating the pressure of the heat exchange fluid within the thermal transport bus 202. In the illustrated embodiment, each heat exchanger 206, 208 has a corresponding bypass conduit 210. However, in alternative embodiments, any number of heat exchangers 206, 208 may have a corresponding bypass conduit 210 so long as there is at least one bypass conduit 210.

Additionally, in several embodiments, the thermal management system 200 includes one or more heat source valves 212 and one or more heat sink valves 214. In general, each heat source valve 212 is configured to control the flow of the heat exchange fluid through a bypass conduit 210 bypassing a heat source heat exchanger 206. Similarly, each heat sink valve 214 is configured to control the flow of the heat exchange fluid through a bypass conduit 210 bypassing a heat sink heat exchanger 208. In this respect, each valve 212, 214 is fluidly coupled to the thermal transport bus 202 and a corresponding bypass conduit 210. As such, each valve 212, 214 may be moved between opened and closed positions to selectively occlude the flow of heat exchange through its corresponding bypass conduit 210.

As will be described below, the valves 212, 214 are controlled based on the pressure of the heat exchange fluid within the thermal transport bus 202. More specifically, as indicated above, in certain instances, the pressure of the heat exchange fluid flowing through the thermal transport bus 202 may fall outside of a desired pressure range. When the pressure of the heat exchange fluid is too high, the thermal management system 200 may incur accelerated wear. In this respect, when the pressure of the heat exchange fluid within the thermal transport bus 102 exceeds a maximum pressure value, one or more heat source valves 212 open. In such instances, at least a portion of the heat exchange fluid flows through the bypass conduits 210 instead of the heat source heat exchanger(s) 206. Thus, less heat is added to the heat exchange fluid by the heat source heat exchanger(s) 206, thereby reducing the temperature and, thus, the pressure of the fluid. In several embodiments, the maximum pressure value is 3800 and 4000 pounds per square inch or less. In some embodiments, the maximum pressure value is between 2700 and 2900 pounds per square inch, such as 2800 pounds per square inch. In other embodiments, the maximum pressure value is between 1300 and 1500 pounds per square inch, such as 1400 pounds per square inch. Such maximum pressure values generally prevent the system 200 from incurring accelerated wear.

Conversely, when the pressure of the heat exchange fluid is too low, the pump 204 may experience operability problems and increased wear. As such, when the pressure of the heat exchange fluid within the thermal transport bus falls below a minimum pressure value, one or more thermal sink valves 214 open. In such instances, at least a portion of the heat exchange fluid flows through the bypass conduits 210 instead of the heat sink heat exchangers 208. Thus, less heat is removed from the heat exchange fluid by the heat sink heat exchangers 208, thereby increasing the temperature and, thus, the pressure of the fluid. In several embodiments, the minimum pressure value is 1070 pounds per square inch or more. In some embodiments, the minimum pressure value is between 1150 and 1350 pounds per square inch, such as 1250 pounds per square inch. In other embodiments, the minimum pressure value is between 2400 and 2600 pounds per square inch, such as 2500 pounds per square inch. Such maximum pressure values generally the heat exchange fluid in a supercritical state (e.g., when the heat exchange fluid is carbon dioxide).

As such, the thermal management system 200 may be configured to operate such that the pressure of the heat transport fluid is maintained with a range extending between the minimum and maximum pressure values. For example, in some embodiments, the range extends from 1070 to 4000 pounds per square inch. Specifically, in one embodiment, the range extends from 1250 to 1400 pounds per square inch. In another embodiment, range extends from 2500 to 2800 pounds per square inch.

Accordingly, the operation of the valves 212, 214 allows the disclosed thermal management system 200 to maintain the pressure of the heat exchange fluid within the thermal transport bus 202 within a specified range of values as the thermal load placed on the thermal management system 200 varies.

Figure 4:
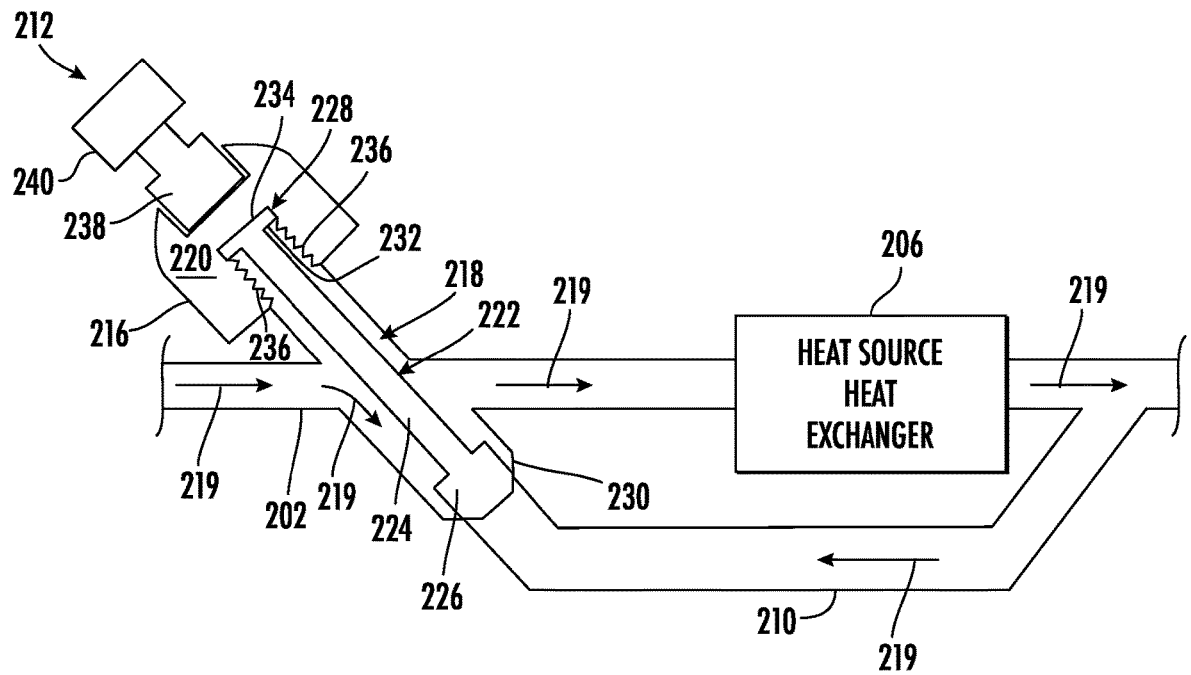
FIG. 4 is a diagrammatic view of one embodiment of a valve suitable for use in the system shown in FIG. 3, illustrating the valve at a closed position.
Figure 5:
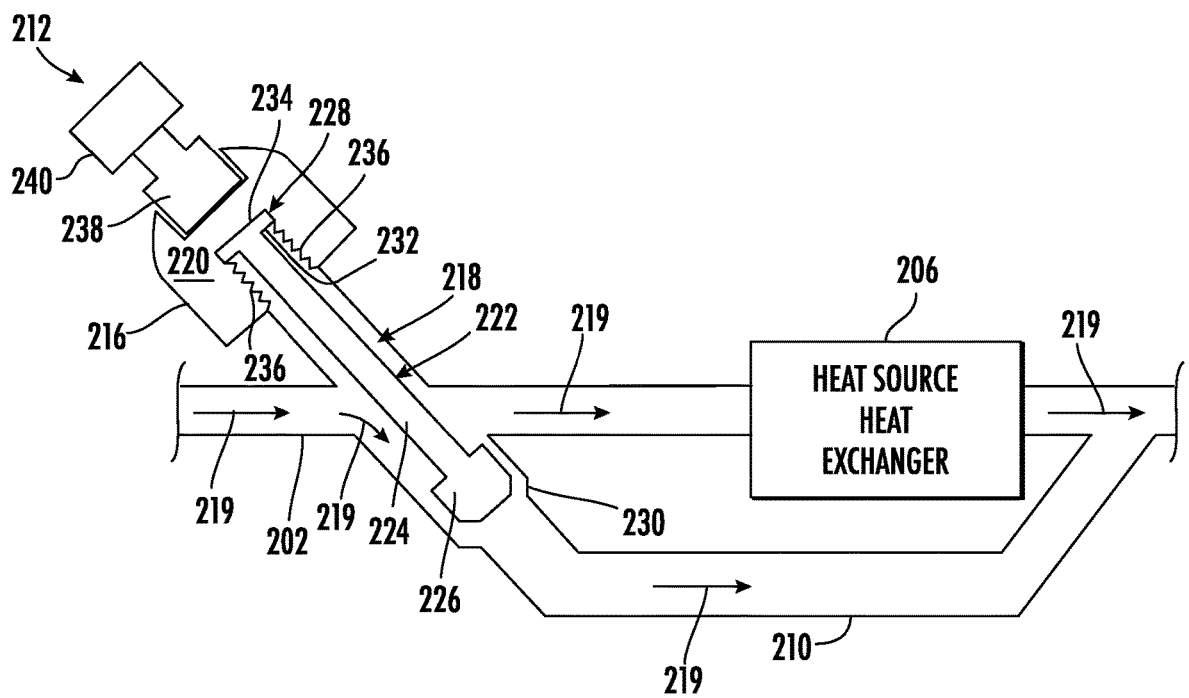
FIG. 5 is a diagrammatic view of the valve shown in FIG. 4, illustrating the valve at a closed position.

FIGS. 4 and 5 illustrate one embodiment of the thermal source valve 212. Specifically, FIG. 4 illustrates the thermal source valve 212 at its closed position, while FIG. 5 illustrates the thermal source valve 212 at its opened position. As shown, in several embodiments, the thermal source valve 212 includes a housing 216 positioned adjacent to the corresponding bypass passage 210. In this respect, the housing 216 defines a first fluid chamber 218 in fluid communication with the thermal transport bus 202. As such, heat transfer fluid (indicated by arrows 219 in FIGS. 4-7) flowing through the thermal transport bus 202 can enter the first fluid chamber 218. Moreover, the housing 216 defines a second fluid chamber 220 fluidly isolated from the first fluid chamber 218 and the thermal transport bus 202.

Additionally, the thermal source valve 212 includes a piston 222. In several embodiments, the piston 222 includes a shaft 224, a first head 226 positioned at one end of the shaft 224, and a second head 228 positioned at an opposed end of the shaft 224. As shown, the piston 222 is slidably positioned within the bypass conduit 210, the thermal transport bus 202, and the housing 218. Specifically, the first head 226 of the piston 222 is positioned within the bypass conduit 210. As will be described below, the first head 226 is in contact with a seat or ledge 230 of the bypass conduit 210 when the valve 212 is at its closed position (FIG. 4) and spaced apart from the seat 230 when the valve 212 is at its opened position (FIG. 5). The rod 222 extends from the first head 226 through the bypass conduit 210 and thermal transport bus 202 and into the housing 216. In this respect, the second head 228 of the piston 222 separates the first and second fluid chambers 218, 220. Thus, the heat exchange fluid within the first fluid chamber 218 acts on a first side 232 of the second head 228, while a control fluid (e.g., air, oil, etc.) within the second fluid chamber 220 acts on an opposed, second side 234 of the second head 228. Moreover, a bellows 236 may couple the second head 228 to the housing 216 such that relative movement is permitted between the piston 222 and the housing 216.

The thermal source valve 212 is controlled based on the pressure differential between the first and second fluid chambers 218, 220. More specifically, as mentioned above, heat exchange fluid from the thermal transport bus 202 flows into the first fluid chamber 218 and exerts a force on the first side 232 of the second head 228 of the piston 222. Furthermore, the control fluid within the second fluid chamber 220 exerts a force on the second side 234 of the second head 228 of the piston 222. When the force exerted by the control fluid is greater than the force exerted by the heat transfer fluid, the piston 222 is moved to its closed position. As shown in FIG. 4, when the piston 222 is at its closed position, the first head 226 contacts the seat 230, thereby occluding flow of the heat exchange fluid through the bypass passage 210. Conversely, when the force exerted by the control fluid is less than the force exerted by the heat transfer fluid, the piston 222 is moved to its open position. As shown in FIG. 5, when the piston 222 is at its open position, the first head 226 is spaced apart from the seat 230, thereby allowing the heat exchange fluid to flow through the bypass passage 210.

The force exerted on the second side 234 of the second head 228 of the piston 222 by the control fluid is set based on the maximum desired pressure of the heat transfer fluid within the thermal transport bus 202. In this respect, when the force exerted by the control fluid is greater than the force exerted by the heat transfer fluid, the pressure of the heat transfer fluid within the thermal transport bus 202 is below the maximum desired pressure. Conversely, when the force exerted by the heat transfer fluid is greater than the force exerted by the control fluid, the pressure of the heat transfer fluid within the thermal transport bus 202 exceeds the maximum desired pressure.

In some embodiments, the pressure of the control fluid within the second fluid chamber (and, thus, the force acting on the second side 234 of the second head 228 of the piston 222) may be adjustable. For example, as shown in FIGS. 4 and 5, the thermal source valve 212 includes a control piston 238 and an actuator 240. More specifically, in such an embodiment, the actuator 240 is configured to move the control piston 238 into and out of the second fluid chamber 220, thereby increasing or decreasing its volume. In this respect, increasing the volume of second fluid chamber 220 (e.g., by moving the control piston 238 away from the piston 222) decreases the pressure therein. Conversely, decreasing the volume of the second fluid chamber 220 (e.g., by moving the control piston 238 toward from the piston 222) increases the pressure therein. However, as will be described below, in other embodiments, the pressure of the control fluid within the second fluid chamber 220 may be adjusted in any other suitable manner.

Figure 6:
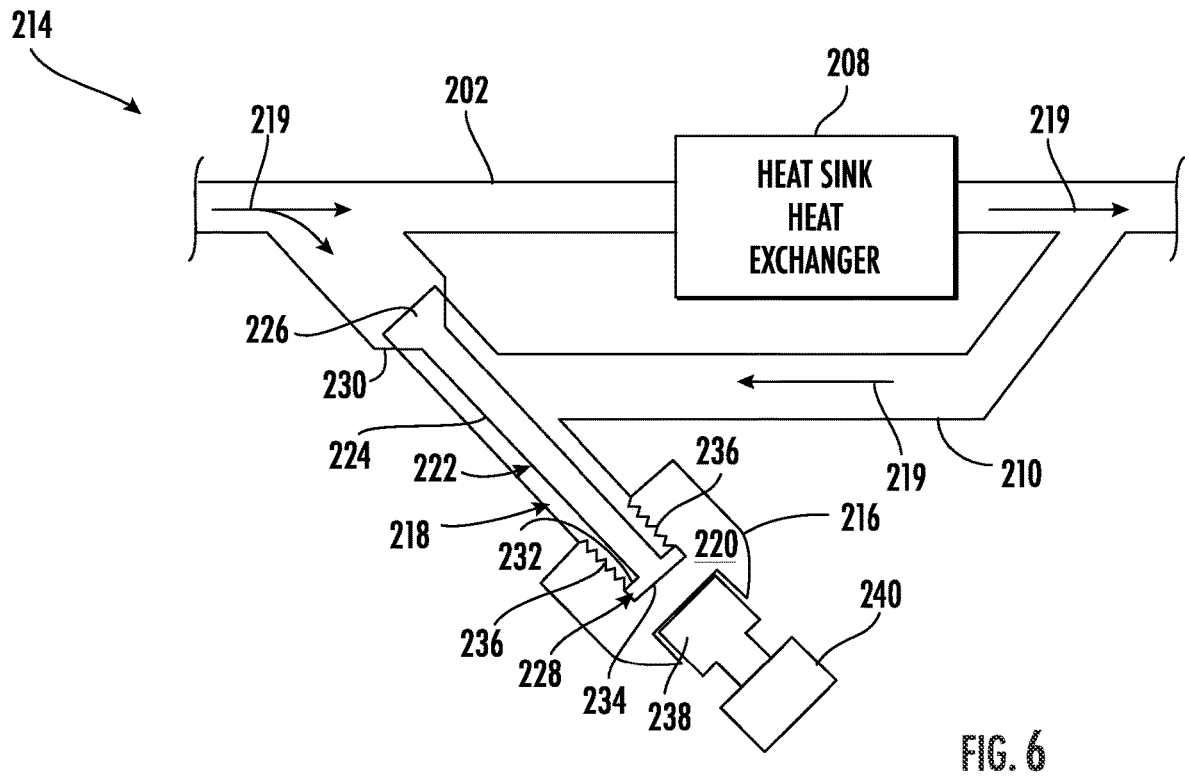
FIG. 6 is a diagrammatic view of another embodiment of a valve suitable for use in the system shown in FIG. 3, illustrating the valve at a closed position.
Figure 7:
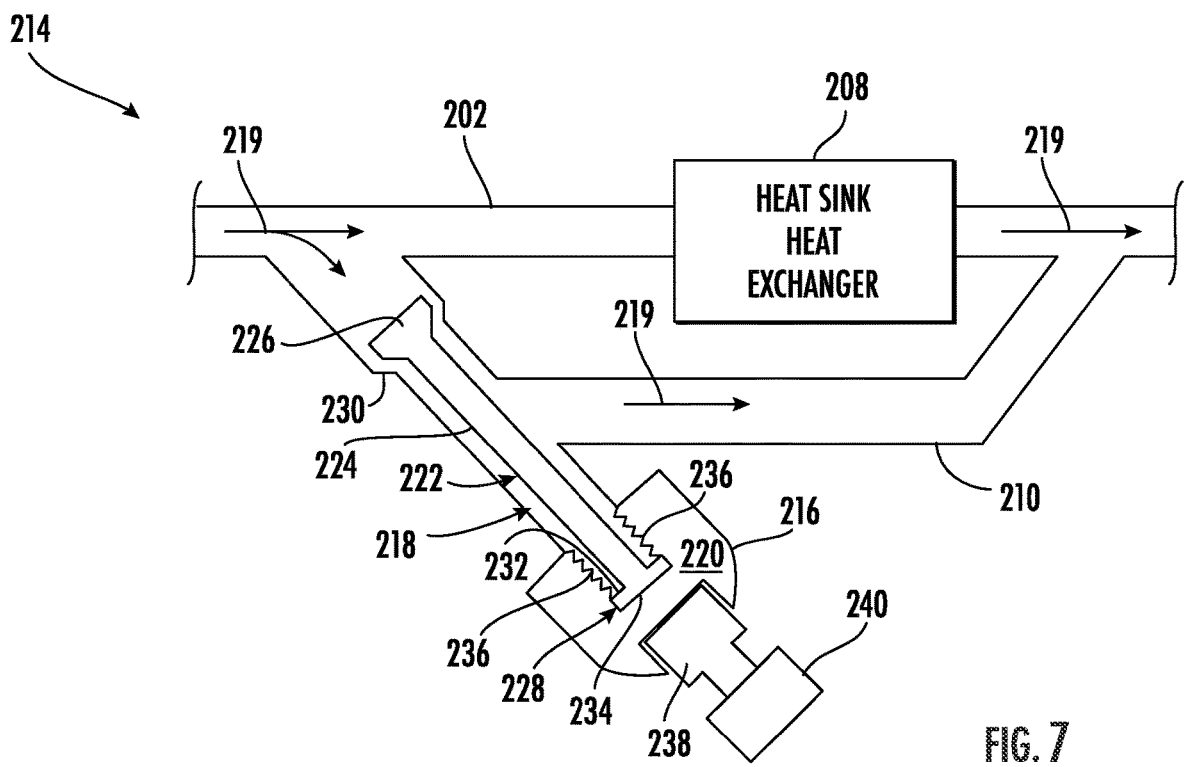
FIG. 7 is a diagrammatic view of the valve shown in FIG. 6, illustrating the valve at a closed position.

FIGS. 6 and 7 illustrate one embodiment of the thermal sink valve 214. Specifically, FIG. 6 illustrates the thermal sink valve 214 at its closed position, while FIG. 7 illustrates the thermal sink valve 214 at its opened position. As shown, in the illustrated embodiment, the thermal sink valve 214 is configured substantially similarly to the thermal source valve 212. For example, like the thermal source valve 212, the thermal sink valve 214 includes a housing 216 defining a first fluid chamber 218 receiving heat transfer fluid and a second fluid chamber 220 containing a control fluid. Moreover, like the thermal source valve 212, the thermal sink valve 214 includes a piston 222 having a first head 226 and an opposed, second head 228. The first head 226 is in contact with a seat or ledge 230 of the bypass conduit 210 when the valve 214 is at its opened position (FIG. 6) and spaced apart from the seat 230 when the valve 214 is at its closed position (FIG. 7). Additionally, the second head 228 has a first side 232 on which the heat exchange fluid within the first fluid chamber 218 acts and a second side 234 on which the control fluid (e.g., air, oil, etc.) within the second fluid chamber 220 acts.

However, the thermal sink valve 214 is oriented differently relative to the bypass conduit 210 than the thermal source valve 212. More specifically, as mentioned above and shown in FIGS. 4 and 5, the housing 216 of the thermal source valve 212 is oriented such that the piston rod 224 extends upstream through the bypass conduit 210 and through the thermal transport bus 202. Such an orientation allows the first head 226 of the thermal source valve 212 to move away from the seat 230 when the pressure of the heat exchange fluid within the first fluid chamber 218 is greater than the pressure of the control fluid within the second fluid chamber 220. Conversely, as shown in FIGS. 6 and 7, the housing 216 of the thermal sink valve 214 is oriented such that the piston rod 224 extends downstream through the bypass conduit 210. In such an embodiment, the piston rod 224 does not extend through the thermal transport bus 202. Such an orientation allows the first head 226 of the thermal sink valve 214 to move away from the seat 230 when the pressure of the heat exchange fluid within the first fluid chamber 218 is less than the pressure of the control fluid within the second fluid chamber 220.

The force exerted on the second side 234 of the second head 228 of the piston 222 by the control fluid is set based on the minimum desired pressure of the heat transfer fluid within the thermal transport bus 202. In this respect, when the force exerted by the control fluid is greater than the force exerted by the heat transfer fluid, the pressure of the heat transfer fluid within the thermal transport bus 202 is below the minimum desired pressure. Conversely, when the force exerted by the heat transfer fluid is greater than the force exerted by the control fluid, the pressure of the heat transfer fluid within the thermal transport bus 202 exceeds the minimum desired pressure.

Figure 8:
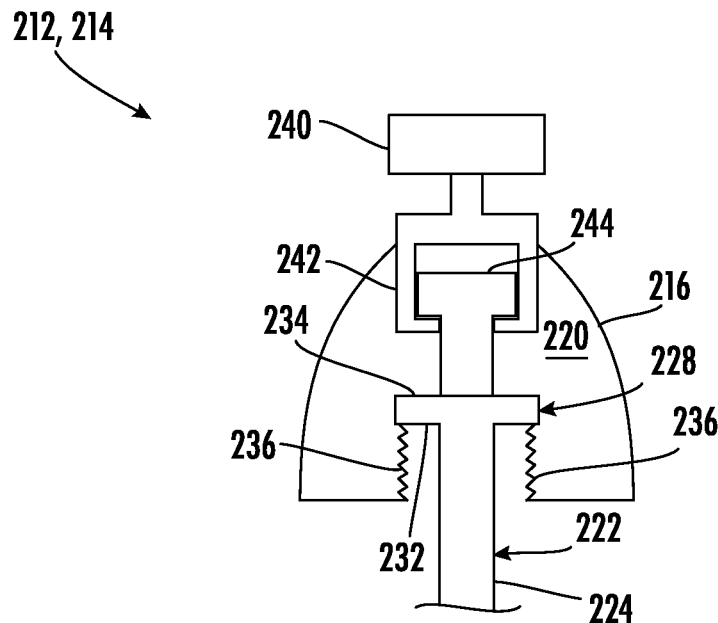
FIG. 8 is a diagrammatic view of a further embodiment of a valve suitable for use in the system shown in FIG. 3.

As mentioned above, the pressure of the control fluid within the second fluid chamber 220 (and, thus, the force acting on the second side 234 of the second head 228 of the piston 222) of the valves 212, 214 may be adjustable. For example, as shown in FIG. 8, in one embodiment, the valves 212, 214 include an actuator 240 and a control arm 242. Specifically, in such an embodiment, the actuator 240 is coupled to the control arm 242. The control arm 242, in turn, receives a third head 244 of the piston 222, with the third head 244 being movable within the control arm 242. As such, the actuator 240 is configured to move the control arm 242 into and out of the second fluid chamber 220, thereby increasing or decreasing its volume. As indicated above, increasing or decreasing the volume of the second fluid chamber 220 increases or decreases the pressure of the control fluid within the second fluid chamber 220.

Figure 9:
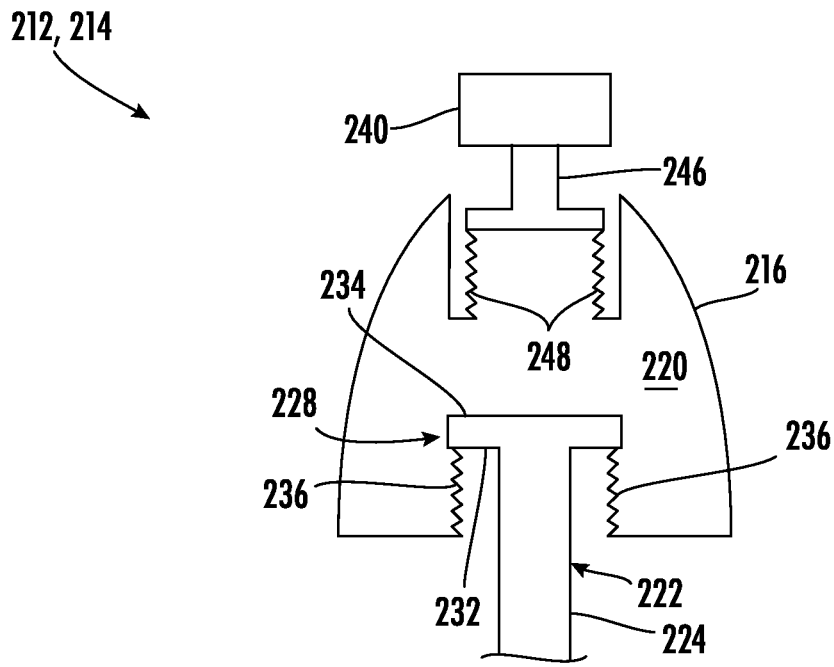
FIG. 9 is a diagrammatic view of yet another embodiment of a valve suitable for use in the system shown in FIG. 3.

Additionally, as shown in FIG. 9, in one embodiment, the valves 212, 214 include an actuator 240, a control piston 246, and a control bellows 248. Specifically, in such an embodiment, the actuator 240 is coupled to the control piston 246. The control piston 246 is, in turn, adjustably coupled to the housing 216 by the control bellows 248. As such, the actuator 240 is configured to move the control piston 246 into and out of the second fluid chamber 220, thereby increasing or decreasing its volume. As indicated above, increasing or decreasing the volume of the second fluid chamber 220 increases or decreases the pressure of the control fluid within the second fluid chamber 220. However, in alternative embodiments, the valves 212, 214 may be configured in any other suitable manner.

Figure 10:
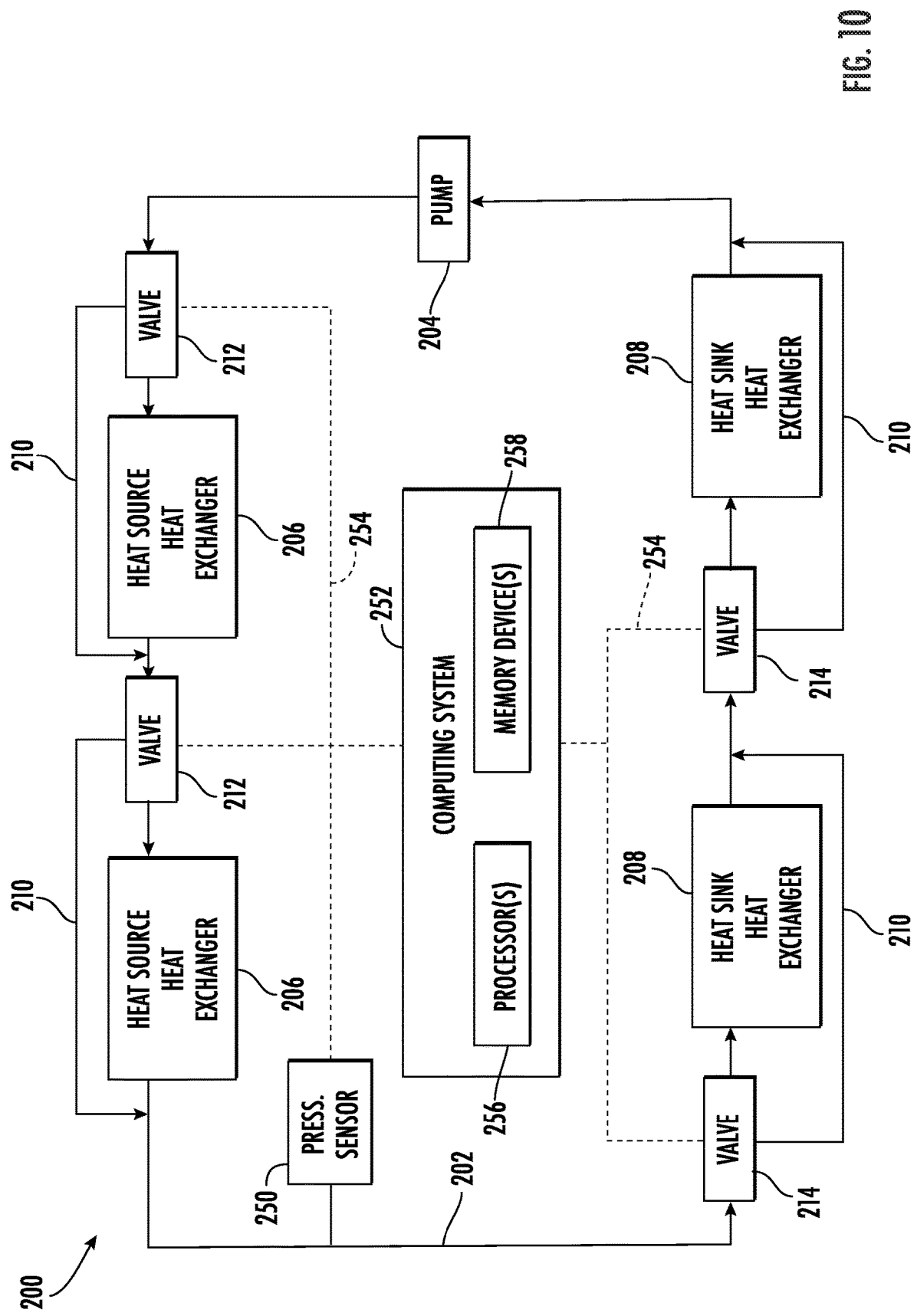
FIG. 10 is a schematic view of another embodiment of a thermal management system for transferring heat between fluids.

FIG. 10 illustrates another embodiment of a thermal management system 200 for transferring heat between fluids. Like the embodiment of the thermal management system 200 shown in FIG. 3, the embodiment of the thermal management system 200 shown in FIG. 10 includes a thermal transport bus 202, a plurality heat source heat exchanger(s) 206 arranged along the thermal transport bus 202, and a plurality heat sink heat exchangers 208 arranged along the thermal transport bus 202. Moreover, like the embodiment of the thermal management system 200 shown in FIG. 3, the embodiment of the thermal management system 200 shown in FIG. 10 includes bypass conduits 210, thermal source valves 212, and thermal sink valves 214. However, unlike the embodiment of the thermal management system 200 shown in FIG. 3 in which the valves 212, 214 are passively controlled, the valves 212, 214 are actively controlled in the embodiment of the thermal management system 200 shown in FIG. 10. In such an embodiment, the valves 212, 214 may be configured as suitable solenoid-controlled valves or other suitable valves that may be actively controlled.

In some embodiments, the thermal management system 200 shown in FIG. 10 may be both actively and passively controlled. For example, in such embodiments, the valves 212, 214 may be actively controlled during operation of the thermal management system 200 to optimize the performance of the system 200 based on captured sensor data as will be described below. As such, the valves 212, 214 may be actively controlled to maintain the system pressure within a first pressure range. Moreover, in such embodiments, the valves 212, 214 may be passively controlled in certain instances. For example, the valves 212 or the valves 214 may passively open when the system pressure falls outside of a second pressure range, with the second pressure range being larger than the first pressure range. However, in alternative embodiments, the thermal management system 200 shown in FIG. 10 may only be actively controlled.

As shown, in several embodiments, the thermal management system 200 includes a pressure sensor 250. In general, the pressure sensor 250 is configured to capture data indicative of the pressure of the heat exchange fluid flowing through the thermal transport bus 202. As such, the pressure sensor 250 may be fluidly coupled to the thermal transport bus 202. The pressure sensor 250 may correspond to any suitable device for capturing data indicative of the pressure of the heat exchange fluid, such as a piezoresistive strain gauge, an electromagnetic pressure sensor, and/or the like.

Furthermore, in several embodiments, the thermal management system 200 includes a computing system 252 communicatively coupled to one or more components of the thermal management system 200 to allow the computing system 252 to electronically or automatically control the operation of such components. For instance, the computing system 252 may be communicatively coupled to the pressure sensor 250 via a communicative link 254. In this respect, the computing system 252 may be configured to receive data indicative of the pressure of the heat exchange fluid flowing through the thermal transport bus 202. Moreover, the computing system 252 may be communicatively coupled to the valves 212, 214 via the communicative link 254. As such, the computing system 252 may be configured to control the operation of valves 212, 214 to adjust the temperature and, thus, the pressure of the heat exchange fluid flowing through the thermal transport bus 202 based on the received pressure sensor data. Additionally, the computing system 252 may be communicatively coupled to any other suitable components of the thermal management system 200 via the communicative link 254.

In general, the computing system 252 may comprise one or more processor-based devices, such as a given controller or computing device or any suitable combination of controllers or computing devices. Thus, in several embodiments, the computing system 252 may include one or more processor(s) 256 and associated memory device(s) 258 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 258 of the computing system 252 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 258 may generally be configured to store suitable computer-readable instructions that, when implemented by the processor(s) 256, configure the computing system 252 to perform various computer-implemented functions, such as one or more aspects of the methods and algorithms that will be described herein. In addition, the computing system 252 may also include various other suitable components, such as a communications circuit or module, one or more input/output channels, a data/control bus and/or the like.

The various functions of the computing system 252 may be performed by a single processor-based device or may be distributed across any number of processor-based devices. In such instances, such processor-based devices may form part of the computing system 252. For instance, the functions of the computing system 252 may be distributed across multiple application-specific controllers, such an engine controller, a navigation controller, a communications controller, and/or the like.

In several embodiments, the computing system 252 is configured to monitor the pressure of the heat exchange fluid flowing through the thermal transport bus 202. More specifically, during operation of the thermal management system 200, the computing system 252 is configured to receive data captured by the pressure sensor 250 (e.g., via the communicative link 254). The computing system 252 is configured to process/analyze the received sensor data to determine the pressure of the heat exchange fluid flowing through the thermal transport bus 202. For example, the computing system 252 may include a suitable look-up table stored within its memory device(s) 258 that respectively correlates the received pressure data to the pressure of the heat exchange fluid flowing through the thermal transport bus 202. In alternative embodiments, the pressure of the heat exchange fluid flowing through the thermal transport bus 202 may be determined or otherwise calculated based on data received from other sensors, such as a temperature sensor (not shown).

Additionally, in several embodiments, the computing system 252 is configured to control the operation of the valves 212 to adjust the temperature and, thus, the pressure of the heat exchange fluid flowing through the thermal transport bus 202 based on the received pressure sensor data. As described above, the thermal management system 200 may experience accelerated wear and/or operability problems when the pressure of the pressure of the heat exchange fluid flowing through the thermal transport bus 202 falls outside of a desired pressure range. In this respect, the computing system 252 may be configured to compare the monitored pressure to a maximum pressure value. Thereafter, when the monitored pressure exceeds the maximum pressure value (thereby indicating that the pressure of the heat exchange fluid flowing through the thermal transport bus 202 is too high), the computing system 252 controls the operation of the heat source valves 212 such that heat transfer fluid flows bypasses the heat source heat exchanger(s) 206. For example, in such instances, the computing system 252 may be configured to control the operation of the heat source valves 212 such that the valves 212 are opened, thereby allowing heat exchange fluid to flow through the corresponding bypass conduits 210. Furthermore, the computing system 252 may be configured to compare the monitored pressure to a minimum pressure value. Thereafter, when the monitored pressure falls below the minimum pressure value (thereby indicating that the pressure of the heat exchange fluid flowing through the thermal transport bus 202 is too low), the computing system 252 controls the operation of the heat sink valves 214 such that heat transfer fluid flows bypasses the heat sink heat exchangers 208. For example, in such instances, the computing system 252 may be configured to control the operation of the heat sink valves 214 such that the valves 214 are opened, thereby allowing heat exchange fluid to flow through the corresponding bypass conduits 210. Additionally, in some embodiments, the thermal management system 200 includes an emergency relief valve (not shown) configured to irreversibly reduce the mass of the heat exchange fluid within the system 200 when the pressure of the heat exchange fluid becomes too great.

FIG. 11 illustrates a further embodiment of a thermal management system 200 for transferring heat between fluids. Like the embodiments of the thermal management system 200 shown in FIGS. 3 and 10, the embodiment of the thermal management system 200 shown in FIG. 11 includes a thermal transport bus 202, a heat source heat exchanger(s) 206 arranged along the thermal transport bus 202, and a plurality heat sink heat exchangers 208 arranged along the thermal transport bus 202. Moreover, like the embodiment of the thermal management system 200 shown in FIG. 10, the embodiment of the thermal management system 200 shown in FIG. 11 includes a pressure sensor 250 and a computing system 252.

However, the pressure of the heat exchange fluid within the thermal transport bus 202 is controlled differently in the embodiment of the thermal management system 200 shown in FIG. 11 than in the embodiments of the thermal management system 200 shown in FIGS. 3 and 10. More specifically, as described above, in the embodiments of the thermal management system 200 shown in FIGS. 3 and 10, the pressure of the heat transfer fluid within the thermal transport bus 202 is regulated by controlling the temperature of the fluid, namely by adjusting the amount of heat added to or removed from the fluid. Conversely, in the embodiment of the thermal management system 200 shown in FIG. 11, the pressure of the heat transfer fluid within the thermal transport bus 202 is regulated by adjusting the mass of the heat transfer fluid within the thermal transport bus 202. In such an embodiment, increasing the mass of the heat transfer fluid within the thermal transport bus 202 increases the pressure of the fluid, while decreasing the mass of the heat transfer fluid within the thermal transport bus 202 decreases the pressure of the fluid.

As shown in FIG. 11, the thermal management system 200 includes a heat transfer fluid mass control device 260. In general, the heat transfer fluid mass control device 260 is configured to increase or decrease the mass of the heat transfer fluid flowing through the thermal transport bus 202 based on the pressure of the heat exchange fluid within the thermal transport bus 202. Specifically, in several embodiments, heat transfer fluid mass control device 260 includes a storage device 262 configured to store heat transfer fluid. As will be described below, when the pressure of the heat transfer fluid exceeds a maximum pressure value, the storage device 262 receives heat transfer fluid from the thermal transport bus 202, thereby reducing the mass of the fluid within the thermal transport bus 202. Conversely, when the pressure of the heat transfer fluid falls below a minimum pressure value, the storage device 262 provides heat transfer fluid to the thermal transport bus 202, thereby increasing the mass of the fluid within the thermal transport bus 202. The thermal transport bus 202 only includes the mass of the heat exchange fluid flowing through the bus 202 and not the mass of the heat exchange fluid within the storage device 262.

In several embodiments, the storage device 262 includes a cylinder 264 and a piston or diaphragm 266. Specifically, in such embodiments, the cylinder 264 defines a first chamber 268 and a second chamber 270. The piston 266 is, in turn, positioned within the cylinder 264 to separate the first and second chambers 268, 270. Furthermore, the piston 266 is movable within the cylinder 264 such that the sizes of the first and second chambers 268, 270 can be varied. Moreover, the first chamber 268 is fluid coupled to the thermal transport bus 202 such that heat exchange fluid can flow between the thermal transport bus 202 and the first chamber 268. Additionally, the second chamber 270 is filled within a control fluid under a predetermined pressure (e.g., compressed air, hydraulic oil, etc.). In this respect, when the pressure of the heat exchange fluid within the first chamber 268 is greater than the pressure of the control fluid within the second chamber 270 (thereby indicating that the pressure of the heat exchange fluid within the thermal transport bus 202 is too high), the size of the first chamber 268 increases and the size of the second chamber 270 decreases. In such instances, heat transfer fluid from the thermal transport bus 202 flows into the enlarged first chamber 268, thereby reducing the mass of the heat transfer fluid within the thermal transport bus 202. Conversely, when the pressure of the heat exchange fluid within the first chamber 268 is less than the pressure of the control fluid within the second chamber 270 (thereby indicating that the pressure of the heat exchange fluid within the thermal transport bus 202 is too low), the size of the first chamber 268 decreases and the size of the second chamber 270 increases. In such instances, heat transfer fluid from the shrinking first chamber 268 flows into the thermal transport bus 202, thereby increasing the mass of the heat transfer fluid within the thermal transport bus 202. However, in alternative embodiments, the storage device 262 may correspond to any other suitable device for storing heat exchange fluid, such as a bladder, a welded bellows, and/or the like.

Moreover, in several embodiments, the storage device 262 is actively controlled. Specifically, in such embodiments, the thermal management system 200 includes a pressure source 272 (e.g., a pump, a plenum, etc.) and a control valve 274. As shown, the pressure source 272 and the control valve 274 are in fluid communication with the second chamber 270. As such, the pressure source 272 is configured to generate and/or store a pressurized control fluid (e.g., air, hydraulic oil, etc.). Furthermore, the control valve 274 is configured to control the flow of the pressurized control fluid from the pressure source 272 to the second chamber 270. Additionally, in some embodiments, the control valve 274 may be communicatively coupled to the computing system 252 (e.g., via the communicative link 254) such that the computing system 252 is able to control the operation of the control valve 274.

In operation, the control valve 274 may be actively controlled to regulate the mass of the heat exchange fluid within the thermal transport bus 202 based on the pressure of the heat exchange fluid within the thermal transport bus 202. In this respect, when the monitored pressure of the heat exchange fluid within the thermal transport bus 202 exceeds the maximum pressure value, the computing system 252 may be configured to control the operation of the control valve 274 such that the control valve 274 allows control fluid to exit the second chamber 270 and flow to a reservoir (not shown). In such instances, the size of the first chamber 268 increases and the size of the second chamber 270 decreases. Such an increase in the size of the first chamber 268 allows more heat exchange fluid to be stored within the first chamber 268, thereby reducing the mass the heat exchange fluid within the thermal transport bus 202. Conversely, when the monitored pressure of the heat exchange fluid within the thermal transport bus 202 falls below the minimum pressure value, the computing system 254 may be configured to control the operation of the control valve 274 such that the control valve 274 is opened to allow pressurized control fluid from the pressure source 272 to flow into the second chamber 270. In such instances, the size of the first chamber 268 decreases and the size of the second chamber 270 increases. Such a decrease in the size of the first chamber 268 allows less heat exchange fluid to be stored within the first chamber 268, thereby increasing the mass the heat exchange fluid within the thermal transport bus 202. However, in alternative embodiments, the storage device 262 may be passively controlled. In further embodiments, the thermal transport system 200 may include a plurality of active or passive mass control devices 260 to ensure a more consistent pressure along the thermal transport bus 202, thereby reducing the size (and improving packageability) of the storage device(s) 260.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A thermal management system for transferring heat between fluids, the thermal management system comprising: a thermal transport bus through which a heat exchange fluid flows; a heat source heat exchanger arranged along the thermal transport bus such that heat is added to the heat exchange fluid flowing through the heat source heat exchanger; a plurality of heat sink heat exchangers arranged along the thermal transport bus such that heat is removed from the heat exchange fluid flowing through the plurality of heat sink heat exchangers; a bypass conduit fluidly coupled to the thermal transport bus such that the bypass conduit allows the heat exchange fluid to bypass one of the heat source heat exchanger or one of the plurality of heat sink heat exchangers; and a valve configured to control a flow of the heat exchange fluid through the bypass conduit based on a pressure of the heat exchange fluid within the thermal transport bus.

The thermal management system of one or more of these clauses, wherein the valve is configured to permit the heat exchange fluid to flow through the bypass passage and bypass the heat source heat exchanger when the pressure of the heat exchange fluid exceeds a maximum pressure value.

The thermal management system of one or more of these clauses, wherein the valve is further configured to prevent the heat exchange fluid from flowing through the bypass passage and bypassing the heat source heat exchanger while the pressure of the heat exchange fluid is below the maximum pressure value.

The thermal management system of one or more of these clauses, wherein the maximum pressure value is between 3800 to 4000 pounds per square inch or less.

The thermal management system of one or more of these clauses, wherein the maximum pressure is 1300-4000 pounds per square inch.

The thermal management system of one or more of these clauses, wherein the maximum pressure value is between 2700 and 2900 pounds per square inch.

The thermal management system of one or more of these clauses, wherein the maximum pressure value is between 1300 and 1500 pounds per square inch.

The thermal management system of one or more of these clauses, wherein the valve is configured to permit the heat exchange fluid to flow through the bypass passage and bypass the one of the heat sink heat exchangers while the pressure of the heat exchange fluid is below a minimum pressure value.

The thermal management system of one or more of these clauses, wherein the valve is further configured to prevent the heat exchange fluid from flowing through the bypass passage and bypassing the heat sink heat exchanger while the pressure of the heat exchange fluid exceeds the minimum pressure value.

The thermal management system of one or more of these clauses, wherein the minimum pressure value is 1070 pounds per square inch or greater.

The thermal management system of one or more of these clauses, wherein the minimum pressure is 1070-2600 pounds per square inch.

The thermal management system of one or more of these clauses, wherein the maximum pressure value is between 1150 and 1350 pounds per square inch.

The thermal management system of one or more of these clauses, wherein the maximum pressure value is between 2400 and 2600 pounds per square inch.

The thermal management system of one or more of these clauses, wherein the valve corresponds to a first valve and the bypass conduit corresponds to a first bypass conduit, the first valve configured to permit the heat exchange fluid to flow through the first bypass passage and bypass the heat source heat exchanger when the pressure of the heat exchange fluid exceeds a maximum pressure value, the system further comprising a second valve and a second bypass conduit, the second valve configured to permit the heat exchange fluid to flow through the second bypass passage and bypass the heat sink heat exchanger while the pressure of the heat exchange fluid is below a minimum pressure value.

The thermal management system of one or more of these clauses, wherein the minimum pressure value is 1070 pounds per square inch and the maximum pressure value is 4000 pounds per square inch.

The thermal management system of one or more of these clauses, wherein the minimum pressure value is 1250 pounds per square inch and the maximum pressure value is 1400 pounds per square inch.

The thermal management system of one or more of these clauses, wherein the minimum pressure value is 2500 pounds per square inch and the maximum pressure value is 2800 pounds per square inch.

The thermal management system of one or more of these clauses, wherein: the bypass conduit corresponds to a first bypass conduit that allows the heat exchange fluid to bypass one of the heat source heat exchanger; the valve corresponds to a first valve configured to control the flow of the heat exchange fluid through the first bypass conduit; and the thermal management system further comprises: a second bypass conduit coupled to the thermal transport bus such that the second bypass conduit allows the heat exchange fluid to bypass one of plurality of heat sink heat exchangers; and a second valve configured to control a flow of the heat exchange fluid through the second bypass conduit based on the pressure of the heat exchange fluid.

The thermal management system of one or more of these clauses, wherein, when the pressure of the heat exchange fluid within the thermal transport bus exceeds a maximum pressure value, the first valve allows at least a portion of the heat exchange fluid to flow through the first bypass conduit.

The thermal management system of one or more of these clauses, wherein, when the pressure of the heat exchange fluid within the thermal transport bus falls below a minimum pressure value, the second valve allows at least a portion of the heat exchange fluid to flow through the first bypass conduit.

The thermal management system of one or more of these clauses, wherein the valve is passively controlled.

The thermal management system of one or more of these clauses, wherein the valve is actively controlled.

The thermal management system of one or more of these clauses, wherein the valve is actively controlled and passively controlled.

The thermal management system of one or more of these clauses, further comprising: a sensor configured to capture data associated with the pressure of the heat exchange fluid within the thermal transport bus; and a computing system communicatively coupled to the sensor, the computing system configured to: monitor the pressure of the heat exchange fluid within the thermal transport bus based on the data captured by the sensor; and control an operation of the valve based on the monitored pressure.

The thermal management system of one or more of these clauses, wherein the valve comprises: a piston including a first head configured to selectively occlude flow of the heat exchange fluid through the bypass conduit and an opposed, second head having a first side on which the heat exchange fluid acts and an opposed, second side on which a control fluid acts; and a control device configured to set a pressure of the control fluid acting on the second side of the second head.

The thermal management system of one or more of these clauses, wherein the piston moves to an opened position at which the heat exchange fluid flows through the bypass conduit when the pressure of the heat exchange fluid acting on the first side is greater than a pressure of the control fluid acting on the second side.

The thermal management system of one or more of these clauses, wherein the bypass conduit allows the heat exchange fluid to bypass one of the heat source heat exchanger.

The thermal management system of one or more of these clauses, wherein the piston moves to an opened position at which the heat exchange fluid flows through the bypass conduit when the pressure of the heat exchange fluid is less than a pressure of the control fluid.

The thermal management system of one or more of these clauses, wherein the bypass conduit allows the heat exchange fluid to bypass one of the plurality of heat sink heat exchangers.

The thermal management system of one or more of these clauses, wherein the control device is an actuator or a bellows.

The thermal management system of one or more of these clauses, wherein the piston corresponds to a first piston and the control device is a second piston.

The thermal management system of one or more of these clauses, wherein the heat exchange fluid is a supercritical fluid.

The thermal management system of one or more of these clauses, wherein the heat exchange fluid is supercritical carbon dioxide.

The thermal management system of one or more of these clauses, wherein at least one of the plurality of heat sink heats exchangers is a fuel system heat exchanger.

A thermal management system for transferring heat between fluids, the thermal management system comprising: a thermal transport bus through which a heat exchange fluid flows; a heat source heat exchanger arranged along the thermal transport bus such that heat is added to the heat exchange fluid flowing through the heat source heat exchanger; a plurality of heat sink heat exchangers arranged along the thermal transport bus such that heat is removed from the heat exchange fluid flowing through the heat source heat exchanger; and a heat transfer fluid mass control device configured to increase or decrease a mass of the heat transfer fluid flowing through the thermal transport bus based on a pressure of the heat exchange fluid within the thermal transport bus.

The thermal management system of one or more of these clauses, wherein the heat transfer fluid mass control device is configured to decrease the mass of the heat transfer fluid flowing through the thermal transport bus when the pressure of the heat exchange fluid exceeds a maximum pressure value.

The thermal management system of one or more of these clauses, wherein the heat transfer fluid mass control device is further configured to prevent the mass of the heat exchange fluid flowing through the thermal transport bus from decreasing while the pressure of the heat exchange fluid is below the maximum pressure value.

The thermal management system of one or more of these clauses, wherein the maximum pressure value is between 3800 to 4000 pounds per square inch or less.

The thermal management system of one or more of these clauses, wherein the maximum pressure value is between 2700 and 2900 pounds per square inch.

The thermal management system of one or more of these clauses, wherein the maximum pressure value is between 1300 and 1500 pounds per square inch.

The thermal management system of one or more of these clauses, wherein the heat transfer fluid mass control device is configured to increase the mass of the heat transfer fluid flowing through the thermal transport bus while the pressure of the heat exchange fluid is below a minimum pressure value.

The thermal management system of one or more of these clauses, wherein the heat transfer fluid mass control device is further configured to prevent the mass of the heat exchange fluid flowing through the thermal transport bus from increasing while the pressure of the heat exchange fluid is above the minimum pressure value.

The thermal management system of one or more of these clauses, wherein the minimum pressure value is 1070 pounds per square inch or greater.

The thermal management system of one or more of these clauses, wherein the maximum pressure value is between 1150 and 1350 pounds per square inch.

The thermal management system of one or more of these clauses, wherein the maximum pressure value is between 2400 and 2600 pounds per square inch.

The thermal management system of one or more of these clauses, wherein the heat transfer fluid mass control device is configured to decrease the mass of the heat transfer fluid flowing through the thermal transport bus when the pressure of the heat exchange fluid exceeds a maximum pressure value and increase the mass of the heat transfer fluid flowing through the thermal transport bus while the pressure of the heat exchange fluid is below a minimum pressure value.

The thermal management system of one or more of these clauses, wherein the minimum pressure value is 1070 pounds per square inch and the maximum pressure value is 4000 pounds per square inch.

The thermal management system of one or more of these clauses, wherein the minimum pressure value is 1250 pounds per square inch and the maximum pressure value is 1400 pounds per square inch.

The thermal management system of one or more of these clauses, wherein the minimum pressure value is 2500 pounds per square inch and the maximum pressure value is 2800 pounds per square inch.

The thermal management system of one or more of these clauses, wherein the storage device is configured to actively control the mass of the heat exchange fluid flowing through the thermal transport bus.

The thermal management system of one or more of these clauses, wherein the heat transfer fluid mass control device comprises a storage device.

The thermal management system of one or more of these clauses, wherein the storage device comprises: a cylinder defining a first chamber in fluid communication with the thermal transport bus and a second chamber; and a piston separating the first chamber and the second chamber, wherein the heat transfer fluid mass control device further comprises a valve configured to control a flow of a control fluid to the second chamber.

The thermal management system of one or more of these clauses, wherein the heat exchange fluid is a supercritical fluid.

The thermal management system of one or more of these clauses, wherein the heat exchange fluid is supercritical carbon dioxide.

The thermal management system of one or more of these clauses, wherein at least one of the plurality of heat sink heat exchangers is a fuel system heat exchanger.

A thermal management system for transferring heat between fluids, the thermal management system comprising: a thermal transport bus through which a heat exchange fluid flows; a heat source heat exchanger arranged along the thermal transport bus such that heat is added to the heat exchange fluid flowing through the heat source heat exchanger; and a plurality of heat sink heat exchangers arranged along the thermal transport bus such that heat is removed from the heat exchange fluid flowing through the plurality of heat sink heat exchangers; and a third-stream flow path of a gas turbine engine, the third-stream flow path extending from a compressed air flow path upstream of a combustion section of the gas turbine engine to a bypass passage of the gas turbine engine, wherein at least one of the plurality of heat exchangers is configured to transfer heat from the heat exchange fluid to air flowing through the third-stream flow path.

A thermal management system for transferring heat between fluids, the thermal management system comprising: a thermal transport bus through which a heat exchange fluid flows; a heat source heat exchanger arranged along the thermal transport bus such that heat is added to the heat exchange fluid flowing through the heat source heat exchanger, the heat exchange fluid being a supercritical fluid; a first bypass conduit fluidly coupled to the thermal transport bus such that the first bypass conduit allows the heat exchange fluid to bypass the heat source heat exchanger; a plurality of heat sink heat exchangers arranged along the thermal transport bus such that heat is removed from the heat exchange fluid flowing through the plurality of heat sink heat exchangers, at least one of the plurality of heat sink heat exchangers being a fuel system heat exchanger; a second bypass conduit fluidly coupled to the thermal transport bus such that the second bypass conduit allows the heat exchange fluid to bypass the one of the plurality of heat sink heat exchangers; and a first valve configured to permit the heat exchange fluid to flow through the first bypass passage and bypass the heat source heat exchanger when the pressure of the heat exchange fluid exceeds a maximum pressure value; and a second valve configured to permit the heat exchange fluid to flow through the second bypass passage and bypass the one of the plurality of heat sink heat exchangers when the pressure of the heat exchange fluid falls below a minimum pressure value.

What is claimed is:

1. A thermal management system for transferring heat between fluids, the thermal management system comprising:
    a thermal transport bus through which a heat exchange fluid flows;
    a heat source heat exchanger arranged along the thermal transport bus such that heat is added to the heat exchange fluid flowing through the heat source heat exchanger;
    a plurality of heat sink heat exchangers arranged along the thermal transport bus such that heat is removed from the heat exchange fluid flowing through the plurality of heat sink heat exchangers;
    a bypass conduit fluidly coupled to the thermal transport bus such that the bypass conduit allows the heat exchange fluid to bypass the heat source heat exchanger or one of the plurality of heat sink heat exchangers; and
    a valve that controls a flow of the heat exchange fluid through the bypass conduit based on a pressure of the heat exchange fluid within the thermal transport bus.

2. The thermal management system of claim 1, wherein the valve permits the heat exchange fluid to flow through the bypass conduit and bypass the heat source heat exchanger when the pressure of the heat exchange fluid exceeds a maximum pressure value.

3. The thermal management system of claim 2, wherein the maximum pressure value is 1300-4000 pounds per square inch.

4. The thermal management system of claim 3, wherein the minimum pressure value is 1070-2600 pounds per square inch.

5. The thermal management system of claim 1, wherein the valve permits the heat exchange fluid to flow through the bypass conduit and bypass the one of the heat sink heat exchangers while the pressure of the heat exchange fluid is below a minimum pressure value.

6. The thermal management system of claim 1, wherein:
the bypass conduit corresponds to a first bypass conduit that allows the heat exchange fluid to bypass heat source heat exchanger;
the valve corresponds to a first valve configured to control the flow of the heat exchange fluid through the first bypass conduit; and
the thermal management system further comprises:
a second bypass conduit coupled to the thermal transport bus such that the second bypass conduit allows the heat exchange fluid to bypass one of plurality of heat sink heat exchangers; and
a second valve that controls a flow of the heat exchange fluid through the second bypass conduit based on the pressure of the heat exchange fluid.

7. The thermal management system of claim 6, wherein, when the pressure of the heat exchange fluid within the thermal transport bus exceeds a maximum pressure value, the first valve allows at least a portion of the heat exchange fluid to flow through the first bypass conduit.

8. The thermal management system of claim 6, wherein, when the pressure of the heat exchange fluid within the thermal transport bus falls below a minimum pressure value, the second valve allows at least a portion of the heat exchange fluid to flow through the first bypass conduit.

9. The thermal management system of claim 1, wherein the valve is passively controlled.

10. The thermal management system of claim 1, wherein the valve is actively controlled.

11. The thermal management system of claim 10, wherein the valve is actively controlled and passively controlled.

12. The thermal management system of claim 10, further comprising:
a sensor configured to capture data associated with the pressure of the heat exchange fluid within the thermal transport bus; and
a computing system communicatively coupled to the sensor, the computing system configured to:
monitor the pressure of the heat exchange fluid within the thermal transport bus based on the data captured by the sensor; and
control an operation of the valve based on the monitored pressure.

13. The thermal management system of claim 1, wherein the valve comprises:
a piston including a first head configured to selectively occlude flow of the heat exchange fluid through the bypass conduit and an opposed, second head having a first side on which the heat exchange fluid acts and an opposed, second side on which a control fluid acts; and
a control device configured to set a pressure of the control fluid acting on the second side of the second head.

14. The thermal management system of claim 13, wherein the piston moves to an opened position at which the heat exchange fluid flows through the bypass conduit when the pressure of the heat exchange fluid acting on the first side is greater than a pressure of the control fluid acting on the second side.

15. The thermal management system of claim 14, wherein the bypass conduit allows the heat exchange fluid to bypass the heat source heat exchanger.

16. The thermal management system of claim 13, wherein the piston moves to an opened position at which the heat exchange fluid flows through the bypass conduit when the pressure of the heat exchange fluid is less than a pressure of the control fluid.

17. The thermal management system of claim 16, wherein the bypass conduit allows the heat exchange fluid to bypass one of the plurality of heat sink heat exchangers.

18. A thermal management system for transferring heat between fluids, the thermal management system comprising:
a thermal transport bus through which a heat exchange fluid flows;
a heat source heat exchanger arranged along the thermal transport bus such that heat is added to the heat exchange fluid flowing through the heat source heat exchanger;
a plurality of heat sink heat exchangers arranged along the thermal transport bus such that heat is removed from the heat exchange fluid flowing through the heat source heat exchanger; and
a heat transfer fluid mass control device that increases or decreases a mass of the heat transfer fluid flowing through the thermal transport bus based on a pressure of the heat exchange fluid within the thermal transport bus.

19. The thermal management system of claim 18, wherein the storage device is configured to actively control the mass of the heat exchange fluid flowing through the thermal transport bus.

20. The thermal management system of claim 18, wherein the heat transfer fluid mass control device comprises a storage device.

21. The thermal management system of claim 20, wherein the storage device comprises:
a cylinder defining a first chamber in fluid communication with the thermal transport bus and a second chamber; and
a piston separating the first chamber and the second chamber, wherein the heat transfer fluid mass control device further comprises a valve configured to control a flow of a control fluid to the second chamber.

22. A thermal management system for transferring heat between fluids, the thermal management system comprising:
a thermal transport bus through which a heat exchange fluid flows;
a heat source heat exchanger arranged along the thermal transport bus such that heat is added to the heat exchange fluid flowing through the heat source heat exchanger; and
a plurality of heat sink heat exchangers arranged along the thermal transport bus such that heat is removed from the heat exchange fluid flowing through the plurality of heat sink heat exchangers; and
a third-stream flow path of a gas turbine engine, the third-stream flow path extending from a compressed air flow path upstream of a combustion section of the gas turbine engine to a bypass passage of the gas turbine engine,
wherein at least one of the plurality of heat exchangers is configured to transfer heat from the heat exchange fluid to air flowing through the third-stream flow path.

* * * * *